US009574280B2

(12) United States Patent
Ishikawa et al.

(10) Patent No.: US 9,574,280 B2
(45) Date of Patent: Feb. 21, 2017

(54) CONTACT AND ELECTRONIC COMPONENT USING THE SAME

(75) Inventors: Yoko Ishikawa, Shiga (JP); Kuniyoshi Maezawa, Hyogo (JP)

(73) Assignee: OMRON Corporation, Kyoto (JP)

( * ) Notice: Subject to any disclaimer, the term of this patent is extended or adjusted under 35 U.S.C. 154(b) by 180 days.

(21) Appl. No.: 14/361,887

(22) PCT Filed: Mar. 13, 2012

(86) PCT No.: PCT/JP2012/056478
§ 371 (c)(1),
(2), (4) Date: May 30, 2014

(87) PCT Pub. No.: WO2013/088752
PCT Pub. Date: Jun. 20, 2013

(65) Prior Publication Data

US 2014/0329418 A1 Nov. 6, 2014

(30) Foreign Application Priority Data

Dec. 15, 2011 (JP) ................................ 2011-274908

(51) Int. Cl.
*C22C 19/03* (2006.01)
*H01M 2/02* (2006.01)
*C25D 1/00* (2006.01)
*H01R 13/03* (2006.01)
*H01R 13/24* (2006.01)
*C25D 3/56* (2006.01)

(52) U.S. Cl.
CPC ................ *C25D 1/00* (2013.01); *C22C 19/03* (2013.01); *C25D 3/562* (2013.01); *H01R 13/03* (2013.01); *H01R 13/24* (2013.01); *H01R 13/2407* (2013.01)

(58) Field of Classification Search
CPC .......... C25D 1/00; C25D 3/562; C22C 19/03; H01R 13/03; H01R 13/24; H01R 13/2407
USPC ........................................................ 252/500
See application file for complete search history.

(56) References Cited

U.S. PATENT DOCUMENTS 3,963,587 A 6/1976 Kreckel
2003/0144388 A1 7/2003 Swift et al.
2006/0068272 A1 3/2006 Takami et al.
(Continued)

FOREIGN PATENT DOCUMENTS

CN 1753240 A 3/2006
CN 101652905 A 2/2010
(Continued)

OTHER PUBLICATIONS

International Search Report for corresponding International Application No. PCT/JP2012/056478, mailed May 22, 2012 (2 pages).
(Continued)

*Primary Examiner* — Mark Kopec
*Assistant Examiner* — Danny N Kang
(74) *Attorney, Agent, or Firm* — Osha Liang LLP

(57) ABSTRACT

A composition for making a contact includes a nickel-cobalt alloy containing 1% by weight or more to less than 20% by weight of cobalt, and 0.002 part by weight or more to 0.1 part by weight or less of sulfur with respect to 100 parts by weight of the nickel-cobalt alloy. The composition has an average particle size of 0.07 μm or larger to 0.35 μm or smaller.

5 Claims, 6 Drawing Sheets

(56) References Cited

U.S. PATENT DOCUMENTS

| | | | | |
|---|---|---|---|---|
| 2006/0087794 | A1 | 4/2006 | Sakata et al. | |
| 2008/0293297 | A1 | 11/2008 | Wakamatsu et al. | |
| 2010/0065430 | A1* | 3/2010 | Hemmi ................ | H01R 12/716 205/50 |
| 2010/0107927 | A1 | 5/2010 | Stewart et al. | |
| 2010/0201326 | A1 | 8/2010 | Takami et al. | |
| 2012/0077069 | A1* | 3/2012 | Maezawa ............... | C25D 3/562 429/121 |

FOREIGN PATENT DOCUMENTS

| | | | |
|---|---|---|---|
| JP | 10-197562 | A | 7/1998 |
| JP | 2000-244084 | A | 9/2000 |
| JP | 2006-128326 | A | 5/2006 |
| JP | 2006-347165 | A | 12/2006 |
| JP | 2007-95336 | A | 4/2007 |
| JP | 2008-078061 | A | 4/2008 |
| JP | 2008078061 | A * | 4/2008 |
| JP | 2008-262780 | A | 10/2008 |
| WO | 2010/089840 | A1 | 8/2010 |
| WO | 2011/111639 | A1 | 9/2011 |

OTHER PUBLICATIONS

Written Opinion issued in corresponding International Application No. PCT/JP2012/056478, mailed May 22, 2012 (3 pages).

International Preliminary Report on Patentability issued in PCT/JP2012/056478, mailed on Jun. 26, 2014 (5 pages).

Written Opinion issued in corresponding International Application No. PCT/JP2011/055144 , mailed Apr. 5, 2011 (4 pages).

International Search Report issued in PCT/JP2011/055144, mailed Apr. 5, 2011 (7 pages).

Office Action in counterpart Chinese Patent Application No. 201180002181.6, mailed Jul. 30, 2012 (12 pages).

Office Action in counterpart Taiwanese Patent Application No. 100107072, mailed Jul. 23, 2013 (17 pages).

Office Action in counterpart Japanese Patent Application No. 2011-274908, mailed May 8, 2012 (10 pages).

Notice of Allowance issued in corresponding U.S. Appl. No. 13/322,083, mailed Jan. 15, 2014 (8 pages).

Non-Final Office Action issued in corresponding U.S. Appl. No. 13/322,083, mailed May 18, 2012 (9 pages).

Final Rejection issued in corresponding U.S. Appl. No. 13/322,083, mailed Nov. 5, 2012 (9 pages).

Non-Final Rejection issued in corresponding U.S. Appl. No. 13/322,083, mailed Jun. 27, 2013 (10 pages).

Kubota et al., "The Effect of S Content in Deposit on Low-cycle Fatigue Properties of Ni Film Electroplated from Sulfamate Baths." The Iron and Steel Institute of Japan, vol. 86, No. 1, 2000, pp. 38-44, and partial English translation thereof (8 pages).

* cited by examiner

CONTACT AND ELECTRONIC COMPONENT USING THE SAME

BACKGROUND

Technical Field

The present invention relates to compositions for making contacts, contacts made therewith, and methods for making contacts. More specifically, the present invention relates to: a composition for making a contact which composition contains a predetermined amount of cobalt and a predetermined amount of sulfur and has a predetermined average particle size, thereby making it possible to achieve a short-stroke contact that exhibits a high Young's modulus; a contact made therewith; and a method for making a contact.

Related Art

Connectors are widely used to attach and detach an electronic part, a cable, or the like to and from another part for mutual exchange of electrical power, a signal, or the like between the parts or between the part and the cable. A connector includes: a housing constituted by an insulator such as resin; and a contact constituted by metal.

Such a contact needs to be pressed against a conductive member of a part to which it is connected, such as an electrode of a battery, so as to be in touch (sliding contact) with the conductive member. In order to maintain the touch, the contact is required to elastically deform in resistance to a load being applied to the contact along with the touch and, when the load has been removed, elastically deform to return to the state in which it had been before the application of the load.

FIG. 5 is a vertical cross-sectional view showing an example of a contact of a common battery connector. (a) of FIG. 5 shows a state in which no load is being applied, and (b) of FIG. 5 shows a state in which a load is being applied.

In FIG. 5, a contact 200 includes: a retaining section 201, which is fixed by an insulator; a contact section 202, which makes sliding contact with a conductive member; and an elastic deformation section 203, which connects the retaining section and the contact section to each other and which is elastically deformable. The contact 200 is connected to a conductive member 204.

Sliding contact of the contact section 202 with the conductive member 204 causes a load to be applied to the elastic deformation section 203, with the result that, as shown in (b) of FIG. 5, the elastic deformation section 203 elastically deforms. The larger the amount of displacement of the elastic deformation section 203 along with the application of the load is, i.e., the longer the stroke is, the larger the force of contact between the contact 200 and the conductive member 204 is.

In recent years, there has been an expansion in battery capacity of multifunctional portable phones (smartphones) that use a variety of applications, and there has been an increase in battery size accordingly. However, as opposed to such an expansion in battery size, there has been a demand for a reduction in size of portable phones. Therefore, there has been a demand for reductions in height and size of connectors that connect batteries and substrates.

As mentioned above, the longer the stroke is, the larger the force of contact between the contact and a conductive member is. However, for a reduction in height of the connector, it is necessary to ensure contact force with the stroke made shorter. In this specification, the stroke for achieving necessary and sufficient contact force required of the contact is referred to as "short stroke".

For a short stroke, i.e. for necessary and sufficient contact force with a small stroke, it is necessary for the contact to be constituted by a material having a high Young's modulus.

Repetition of attachment and detachment of a contact causes the stress of a load to go beyond the acceptable range of stress, with the result that the contact is damaged by fatigue. Therefore, it is necessary to limit the stress of a load to the acceptable range of stress or lower. In order for the stress of a load to fall within the acceptable range of stress, it is necessary for the material constituting the contact to have a high 0.2% proof stress.

Further, since the contact is used in applications where it is necessary to pass an electric current through the contact, a high conductivity is required. A low conductivity results in generation of heat due to power loss, thus making it impossible to pass an electric current. Further, from a point of view of energy conservation, a reduction in power loss is required.

Further, since the contact becomes lower in conductivity by rusting over time, the contact is required to have a certain degree of corrosion resistance.

There is a phenomenon known as "copper damage", in which a metal such as copper or cobalt degrades a resin such as polyimide by reacting with the resin. Since the retaining section of a contact is usually composed mainly of resin, an occurrence of copper damage invites damage to the retaining section, thus making it impossible to achieve necessary and sufficient contact force.

Therefore, a contact that can cause copper damage to occur imposes a limitation on the types of resin that can be used, and as such, cannot be extended to versatile applications.

Patent Literature 1 discloses a contact formed into a spiral shape by using an electroformed layer made of a copper-tin (Cu—Sn) alloy having a tin composition ratio of 5 at % or greater to 25 at % or less. The contact disclosed in Patent Literature 1 has its tin composition ratio adjusted so that a high 0.2% proof stress and a high conductivity can be achieved.

However, as will be confirmed below in Comparative Example 7 by the inventors of the present invention, the copper-tin alloy has a low Young's modulus. Therefore, the contact disclosed in Patent Literature 1 is thought to be in a spiral shape with a large stroke for the purpose of achieving necessary and sufficient contact force.

Further, Patent Literature 2 discloses an elastic contact maker formed by using an electroformed layer made of a nickel-cobalt (NiCo) alloy having its cobalt composition ratio adjusted to 1 at % or greater to 30 at % or less and having its average particle size adjusted to 20 nm or smaller.

The contact maker disclosed in Patent Literature 2 has both its cobalt composition ratio and its particle size adjusted so that a high 0.2% proof stress (yield stress) can be achieved.

However, the contact maker disclosed in Patent Literature 2 must have an average particle size adjusted to 20 nm or smaller. As will be confirmed below in Comparative Example 5 by the inventors of the present invention that the conductivity of a composition for making a contact which composition has an average particle size of 60 nm is low, the conductivity of the elastic contact maker is thought to be similarly low.

Therefore, the elastic contact maker disclosed in Patent Literature 2 is thought to be limited exclusively to a special application, as in the case of semiconductor inspection equipment, in which a high conductivity is not required.

CITATION LIST

Patent Literature 1

Japanese Patent Application Publication, Tokukai, No. 2007-95336 A (Publication Date: Apr. 12, 2007)

Patent Literature 2

Japanese Patent Application Publication, Tokukai, No. 2008-78061 A (Publication Date: Apr. 3, 2008)

SUMMARY

When a semiconductor including a spiral-shaped contact disclosed in Patent Literature 1 is pressed with its back side facing an insulating substrate, the spiral terminal makes contact with an outer surface of a spherical elastic terminal in such a way as to be wound around the outer surface in a spiral manner, whereby an electrical connection is made between each separate spherical terminal and each separate spiral terminal.

Since the contact disclosed in Patent Literature 1 is in a spiral shape, it achieves a long stroke and has sufficient contact force. However, since the spiral shape is a very unique shape, limitations are placed on the range of conductive members to which the contact is to be connected; therefore, the contact cannot be applied to general-purpose connection terminals. Such a contact of course cannot be used as an electronic component such as a contact that needs to be low in height and small in size.

Further, the elastic contact maker disclosed in Patent Literature 2 has a high 0.2% proof stress (yield stress) by having both its cobalt composition ratio and its average particle size adjusted.

However, since the elastic contact maker has a low conductivity, it undesirably gets heated during conduction. This makes it impossible to pass a high electric current through the elastic contact maker and places limitations on the range of conductive members to which the elastic contact maker is to be connected; therefore, the elastic contact maker undesirably cannot be applied to general-purpose connection terminals.

As seen from the above, there is no availability of a material for achieving a contact which can give necessary and sufficient contact force with a small stroke, which is excellent in conductive property and in corrosion resistance, and which does not exhibit a change in color due to copper damage.

That is, there has been no material sufficient to achieve a highly-versatile contact that can give a short stroke. One or more embodiments of the present invention provides a composition for making a contact which composition contains a predetermined amount of cobalt and a predetermined amount of sulfur and has a predetermined average particle size, a contact made therewith, and a method for making a contact.

The inventors of the present invention diligently studied materials capable of providing a contact which is small in stroke and which can give necessary and sufficient contact force, and invented a composition for making a contact which composition contains a nickel-cobalt alloy containing a predetermined amount of cobalt and a predetermined amount of sulfur and has a predetermined average particle size.

That is, a composition for making a contact according to one or more embodiments of the present invention includes: a nickel-cobalt alloy containing 1% by weight or more to less than 20% by weight of cobalt; and 0.002 part by weight or more to 0.1 part by weight or less of sulfur with respect to 100 parts by weight of the nickel-cobalt alloy, the composition having an average particle size of 0.07 μm or larger to 0.35 μm or smaller.

As will be discussed below in the Examples, the inventors of the present invention extensively investigated correlations between the amount of cobalt that is contained in the nickel-cobalt alloy included in the composition for making a contact, the amount of sulfur that is contained in the composition for making a contact, and the average particle size of the composition for making a contact and Young's modulus, 0.2% proof stress, conductivity, corrosion resistance, and change in color due to copper damage.

As a result, the inventors of the present invention found that in a case where the composition for making a contact has the foregoing configuration, it exhibits excellence in Young's modulus, in 0.2% proof stress, in conductivity, and in corrosion resistance and does not exhibit a change in color due to copper damage, and that such a composition is suitable for providing a versatile contact which is small in stroke and which can give necessary and sufficient contact force.

Therefore, the foregoing configuration makes it possible to provide a useful material for achieving a highly-versatile contact that can ensure necessary and sufficient contact force with a short stroke.

A method for making a contact according to one or more embodiments of the present invention includes an electroforming step of obtaining an electroformed layer by electroforming in a plating solution with a pH of 3.0 or greater to 5.0 or less containing 50 g/L or more to 150 g/L or less of nickel, 1 g/L or more to 30 g/L of cobalt, 20 g/L or more to 40 g/L or less of boric acid, 0.01% by weight or more to 1% by weight or less of a surface-active agent, and a total of 0.001% by weight or more to 1% by weight or less of a brightening agent and a surface-smoothening agent.

The foregoing configuration causes the electroformed layer to be obtained by a simple method as a contact containing the composition for making a contact according to one or more embodiments of the present invention.

This makes it possible to easily make a highly-versatile contact that, what is more, can ensure necessary and sufficient contact force with a short stroke.

A composition for making a contact according to one or more embodiments of the present invention includes: a nickel-cobalt alloy containing 1% by weight or more to less than 20% by weight of cobalt; and 0.002 part by weight or more to 0.1 part by weight or less of sulfur with respect to 100 parts by weight of the nickel-cobalt alloy, the composition having an average particle size of 0.07 μm or larger to 0.35 μm or smaller.

This brings about an effect of making it possible to be suitably used as a material for achieving a highly-versatile contact that can ensure necessary and sufficient contact force with a short stroke.

DETAILED DESCRIPTION

Figure 1:
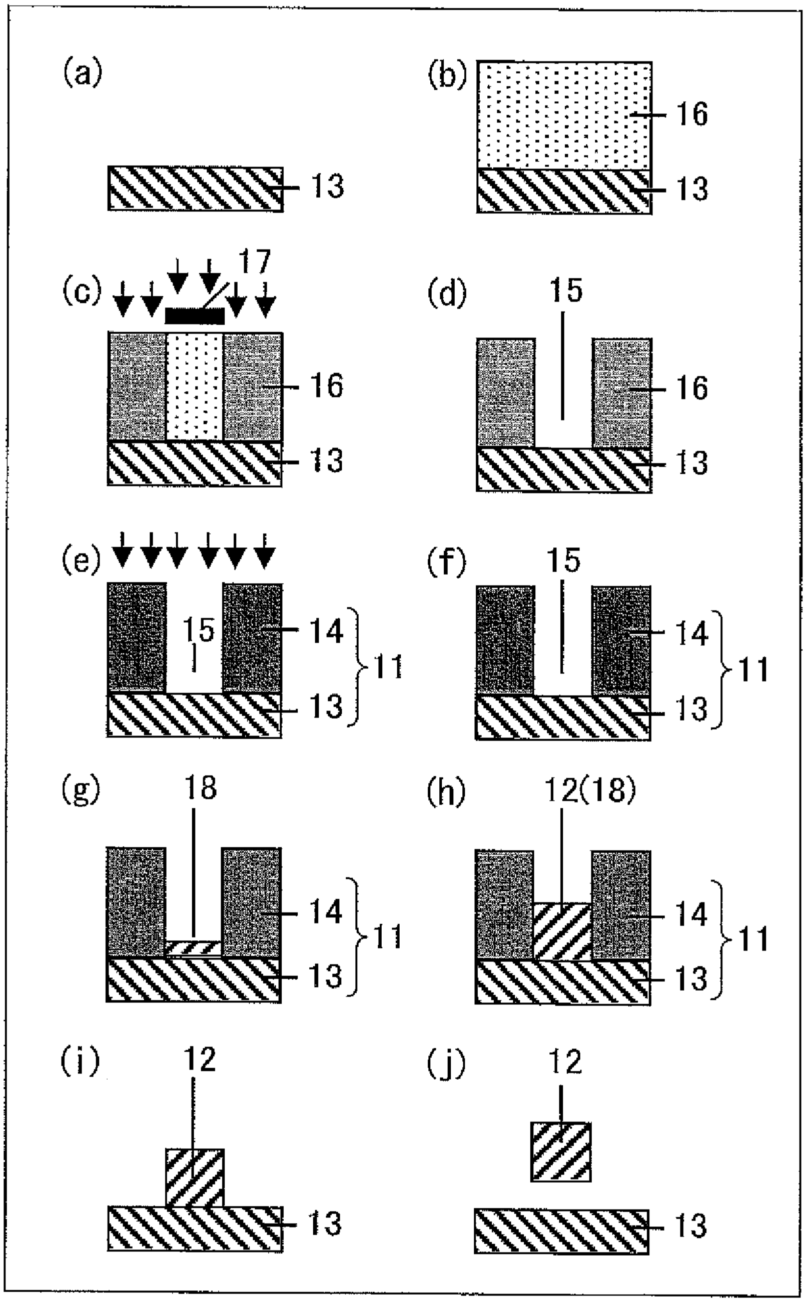
FIG. 1 is a set of cross-sectional views schematically showing steps of a process by which a composition for making a contact is cast by electroforming.

Embodiments of the present invention is described below in detail. Japanese Patent Application Publication, Tokukai, No. 2007-95336 A and Japanese Patent Application Publication, Tokukai, No. 2008-78061 A are hereby incorporated by reference. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(1. Composition for Making a Contact)

A composition for making a contact according to one or more embodiments of the present invention includes: a nickel-cobalt alloy containing 1% by weight or more to less than 20% by weight of cobalt; and 0.002 part by weight or more to 0.05 part by weight or less of sulfur with respect to 100 parts by weight of the nickel-cobalt alloy, the composition having an average particle size of 0.07 μm or larger to 0.35 μm or smaller, and according to one or more embodiments, is 0.10 μm or larger to 0.35 μm or smaller.

The composition for making a contact is composed essentially of an nickel-cobalt alloy and sulfur, and by having the aforementioned cobalt content, sulfur content, and average particle size, has the property to exhibit excellence in Young's modulus, in 0.2% proof stress, in conductivity, and in corrosion resistance and not to exhibit a change in color due to copper damage.

This in turn makes it possible to ensure necessary and sufficient contact force with a short stroke, thus providing an excellent material for making a contact.

The composition for making a contact may contain only a nickel-cobalt alloy and sulfur, but may contain another component as long as the above properties of the composition for making a contact are not impaired. For example, the composition for making a contact may contain C, Cl, etc.

The weight ratio between nickel and cobalt in the nickel-cobalt alloy can be confirmed, for example, by fluorescent X-ray spectrometry in conformity to DIN50987, ISO3497, and ASTM B568.

According to one or more embodiments of the present invention, the nickel-cobalt alloy is composed solely of nickel and cobalt; however, this does not imply any limitation.

That is, although according to one or more embodiments of the present invention, the nickel-cobalt alloy contains 1% by weight or more to less than 20% by weight of cobalt and the remaining component be nickel, the nickel-cobalt alloy may contain another component such as Na, Ca, Mg, Fe, Cu, Mn, Zn, Sn, Pd, Au, Ag, etc. in addition to nickel and cobalt to such an extent that the Young's modulus of the composition for making a contact is not lowered.

In this case, according to one or more embodiments of the present invention; the proportion of another component in the alloy be 0% by weight or more to 10% by weight or less.

The phrase "containing 1% by weight or more to less than 20% by weight of cobalt" means that the nickel-cobalt alloy contains 1% by weight or more to less than 20% by weight of cobalt atoms.

From a point of view of, by improving the Young's modulus of the composition for making a contact, increasing the contact force of a contact containing the composition for making a contact and preventing the occurrence of copper damage, it is necessary that the nickel-cobalt alloy contain 1% by weight or more to less than 20% by weight of cobalt.

Normally, the larger the stroke, the higher the contact force of the contact can be. However, a contact with a large stroke is unsuitable as a contact for use in an electronic component required to be low in height and small in size.

The composition for making a contact according to one or more embodiments of the present invention has a high Young's modulus for 190 MPa or higher and therefore has a high contact force. Specifically, this Young's modulus is equal to or higher than the Young's modulus of SUS304, which is used as a high-strength spring material for a common electronic component. This makes it possible to make a contact that, even with a short stroke, has necessary and sufficient contact force required of a contact.

The term "Young's modulus" in this specification means the value of tensile stress per unit strain of the material. The Young's modulus and the contact force has a proportional relation of $P=dEwt^3/4\ l^3$ (where P is the contact force, d is the amount of displacement, E is the Young's modulus, w is the width, t is the thickness, and l is the length) from a cantilever formula. Therefore, the higher the Young's modulus is, the greater the contact force is.

As will be shown below in the Examples and the Comparative Examples, in a case where the cobalt content of the nickel-cobalt alloy is less than 1% by weight, the Young's modulus of the composition for making a contact can be lower than 190 MPa. This case may not be preferable, because necessary and sufficient contact force required of a contact cannot be kept.

Meanwhile, it is possible to improve the Young's modulus by increasing the cobalt content of the nickel-cobalt alloy. However, it may not be preferable that the cobalt content be 20% by weight or more, because such a high cobalt content can cause copper damage to occur.

The term "copper damage" in this specification means a phenomenon in which a metal such as copper or cobalt causes a change in color of a resin such as polyimide by reacting with the resin and the change in color causes the resin to deteriorate and become fragile. The phrase "no change in color due to copper damage" means a state where there is no change in color of the resin.

Examples of resins that can suffer from copper damage include: rubber such as natural rubber, nitrile rubber, ethylene propylene rubber, and urethane rubber; and plastics such as polyimide, polypropylene, polyethylene, polyurethane, polycarbonate, and vinyl chloride.

In the composition for making a contact according to one or more embodiments of the present invention, since the cobalt content of the nickel-cobalt alloy is less than 20% by weight, the occurrence of copper damage is restrained.

Specifically, no copper damage occurs during joining to polyimide, as in the case of a material obtained by plating phosphor bronze C5191-H, which is used as a spring material for a common electronic component, with a film of nickel having a thickness of 2 μm to 3 μm.

That is, copper damage can be restrained even without plating. This favorably eliminates the need of plating and prevents a fracture from starting at the interface between the plating and the material. Furthermore, the cost of manufacturing a contact can be further reduced. This can contribute to the fabrication of a highly-versatile contact.

The phrase "containing 0.002 part by weight or more to 0.1 part by weight or less of sulfur with respect to 100 parts by weight of the nickel-cobalt alloy" means that the nickel-cobalt alloy contains 0.002 part by weight or more to 0.1 part by weight or less of sulfur atoms with respect to 100 parts by weight of the nickel-cobalt alloy.

From a point of view of improving the 0.2% proof stress of the composition for making a contact and improving corrosion resistance, it is necessary that the nickel-cobalt alloy contains 0.002 part by weight or more to 0.1 part by weight or less of sulfur atoms with respect to 100 parts by weight of the nickel-cobalt alloy.

By having its sulfur content adjusted as mentioned above, the composition for making a contact according to one or more embodiments of the present invention can exhibit a high 0.2% proof stress of 560 MPa or higher, as will be shown below in the Examples.

This 0.2% proof stress is equal to or higher than the 0.2% proof stress of phosphor bronze C5191-H, which is used as a common spring material. This can bring about an improvement in allowable stress of the composition for making a contact, thus allowing preventing the contact from being damaged even in the case of repetition of attachment and detachment of the contact.

The term "0.2% proof stress" in this specification means a value that treats as yield stress the strength at which 0.2% strain is reached in a material which, when subjected to tensile stress, does not clearly exhibit yield stress under which the material is plastically deformed.

That is, the term "0.2% proof stress" means stress that causes 0.2% plastic strain when a material that does not clearly exhibit yield stress has been unloaded.

The allowable stress is determined by multiplying the 0.2% proof stress by a margin of safety. The term "margin of safety" here means a ratio between a stress that would cause the material to be deformed and a stress that allows the material to be used safely (obtained by dividing the former by the latter).

As will be shown below in the Examples and the Comparative Examples, the 0.2% proof stress can be less than 560 MPa in a case where the amount of sulfur atoms that is contained with respect to 100 parts by weight of the nickel-cobalt alloy is less than 0.002 part by weight.

This case is undesirable because a contact containing the composition for making a contact is low in allowable stress and therefore insufficient in resistance to external force.

On the other hand, in a case where sulfur atoms are contained in more than 0.1 part by weight with respect to 100 parts by weight of the nickel-cobalt alloy, the composition for making a contact can exhibit a 0.2% proof stress of 560 MPa or higher. However, this case is undesirable because, in such a case, the composition for making a contact is inferior in corrosion resistance. Specifically, this case is undesirable because, in such a case, the composition for making a contact rusts in a corrosion resistance test (salt spray test, mixed gas test) as will be mentioned later.

A case where the sulfur is contained in 0.002 part by weight or more to 0.05 part by weight or less with respect to 100 parts by weight of the nickel-cobalt alloy is employed according to one or more embodiments of the present invention because, in such a case, the composition for making a contact achieves a better result on a mixed gas test to exhibit better corrosion resistance.

In this case, the composition for making a contact exhibits a high Young's modulus, a high 0.2% proof stress, a high conductivity, and high corrosion resistance (result of a salt spray test) and, at the same time, can both prevent the occurrence of copper damage and exhibit better corrosion resistance (result of a mixed gas test).

As such, the composition for making a contact according to one or more embodiments of the present invention can also be applied to an electronic component that is used in such a stringent environment in a hot and humid region where a combustion gas component is contained in the atmosphere.

Corrosion resistance is a property that depends on the ionization tendency of a metal. Therefore, a reduction of the upper limit on the sulfur content to 0.05 part by weight or less can inhibit the metal from ionizing and running, thus presumably improving corrosion resistance.

It should be noted that the sulfur content of the composition for making a contact can be confirmed by a method called "Infrared absorption method after high-frequency heating and combustion in oxygen flow" (for example, a method described in JIS G1215).

The term "corrosion resistance" in this specification means the ability of a material to prevent a change in color of a surface of the material due to rusting of the material. A color change in appearance of the composition for making a contact is undesirable because such a color change makes it hard for electricity to travel through the composition.

The composition for making a contact according to one or more embodiments of the present invention can restrain itself from rusting in the after-mentioned salt spray test, as with a material obtained by plating phosphor bronze C5191-H, which is used as a spring material for a common electronic component, with a film of nickel having a thickness of 1 μm to 2 μm.

Further, The composition for making a contact according to one or more embodiments of the present invention can restrain itself from rusting in the after-mentioned mixed gas test, as with a material obtained by plating the phosphor bronze with a film of nickel having a thickness of 1 μm to 2 μm and a film of gold having a thickness of 50 nm to 100 nm.

This can bring about an improvement in property of change in power loss over time, thus making it possible to fabricate a conductive contact.

From a point of view of improving the conductivity of the composition for making a contact, it is necessary that the nickel-cobalt alloy have an average particle size of 0.07 μm or larger to 0.35 μm or smaller.

The term "conductivity (% IACS)" in this specification is a comparative value that represents what percent of conductivity a conducting wire has, on the assumption that the conductivity of a standard annealed copper wire is 100%, and is an index by which the larger the value is, the easier electricity is allowed to travel.

It is necessary that the conductivity of the composition for making a contact be equal to or higher than the conductivity (13% IACS) of phosphor bronze C5191-H, which is used for a common conductive contact.

As will be shown below in the Examples, the composition for making a contact according to one or more embodiments of the present invention can exhibit a conductivity of 13% IACS or higher, which is equal to higher than that of phosphor bronze C5191-H. This brings about an improvement in power loss, thus making it possible to fabricate a conductive contact.

A case where the average particle size of the nickel-cobalt alloy is less than 0.07 μm is undesirable because, in such a case, the conductivity of the composition for making a contact can be less than 13% IACS.

Meanwhile, although the conductivity can be improved by increasing the average particle size, a case where the average particle size of the nickel-cobalt alloy is larger than 0.35 μm is undesirable because, in such a case, the 0.2% proof stress can be less than 560 MPa. That is, such a material is unsuitable for a short-stroke contact because it is so low in strength as to be easily broken or bent.

According to one or more embodiments of the present invention, the average particle size be 0.10 μm or larger and 0.35 μm or smaller. In this case, the composition for making a contact exhibits a high Young's modulus, a high 0.2% proof stress, and high corrosion resistance and, at the same time, can both prevent the occurrence of copper damage and exhibit a conductivity of 14% IACS, which is higher than that of phosphor bronze C5191-H. This reduces a loss of power, thus allowing a large volume of electricity to travel.

The conductivity is a value that depends on the mean free path of an electron. Therefore, an increase of the average particle size from 0.07 μm or larger and 0.35 μm or smaller to 0.10 μm or larger and 0.35 μm or smaller lowers a migration barrier to the electron by a grain boundary, thus presumably improving the mean free path and the conductivity.

The term "particle size" in this specification is intended to mean the diameter of the maximum inscribed circle with respect to the two-dimensional shape of each crystal grain in the composition for making a contact as observed by a microscope.

For example, when the two-dimensional shape of each crystal grain in the composition for making a contact is substantially circular, the particle size is intended to be the diameter of that circle, the minor diameter of that ellipse when substantially elliptical, the length of each side of that square when substantially square, or the length of each shorter side of that rectangle when substantially rectangular.

Further, the term "average particle size" means an average of the particle sizes of a plurality of crystal grains in the composition for making a contact.

The average particle size can be measured, for example, by a focused ion beam scanning ion microscope (FIB-SIM). No particular limitations are placed on what type of FIB-SIM is used. However, in the examples to be described later, Further, a cross-section of the composition was processed with a focused ion beam by using a focused ion beam scanning ion microscope (FB-2100, manufactured by Hitachi High-Technologies Corporation) as FIB-SIM. After that, the scanning ion microscope was used to observe crystal grains contained in an area of 10 μm×10 μm along a through-thickness direction from an electrodeposited surface of the composition for making a contact (with a magnification of 50000).

Then, the average particle size was obtained by counting the numbers of grains completely cut by segment of known lengths on an FIB photograph by a cutting method described in JIS-H0501 "Methods for estimating average grain size of wrought copper and copper alloys" and calculating an average of the cut lengths.

Figure 7:
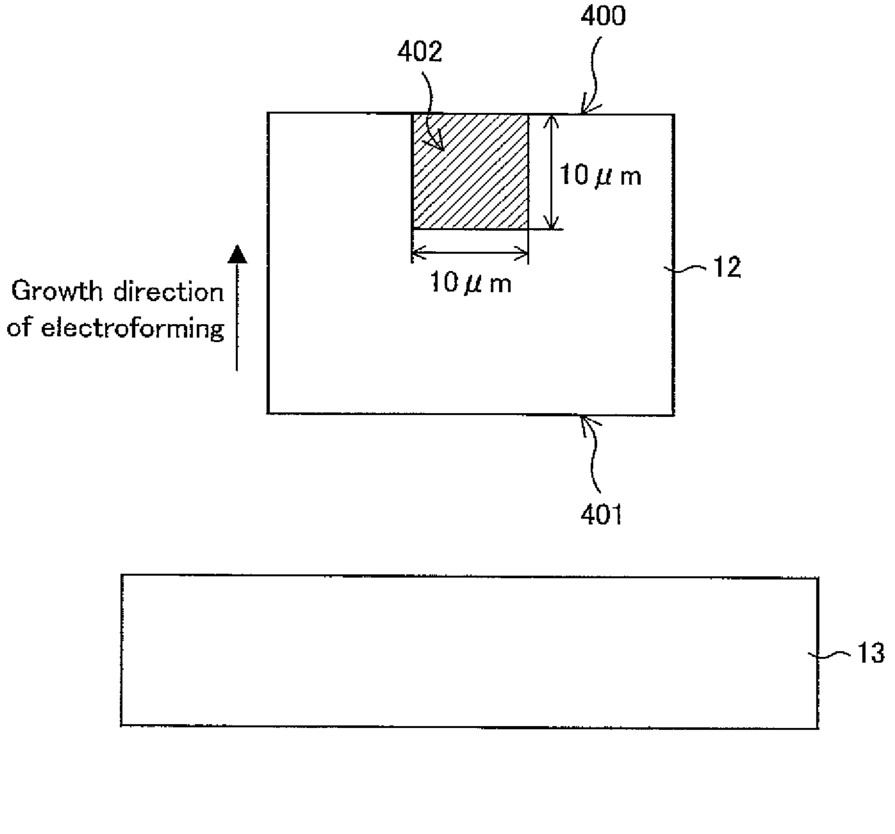
FIG. 7 is a vertical cross-sectional view showing a region in which an observation of crystal grains is made in obtaining the average particle size of an electroformed composition for making a contact.

FIG. 7 is a vertical cross-sectional view showing a region in which the observation is made in obtaining the average particle size of an electroformed composition for making a contact.

FIG. 7 shows a composition 12 for making a contact, a conducting base material 13, an electrodeposited surface 400 of the composition, a surface 401 of the composition that faces the base material, a site of measurement 402 in which the particles sizes of crystal grains are measured.

The average particle size of the composition for making a contact is obtained by using as the site of measurement 402 of FIG. 7 a region having an area of 10 μm×10 μm, observing crystal grains contained in the site of measurement, measuring the particle sizes of every crystal grain contained in the area, and calculating an average of the particle sizes thus measured.

Although the site of measurement 402 is set to be an area of 10 μm×10 μm along a through-thickness direction from the electrodeposited surface 401 of the composition (through the thickness of the electroformed layer), it is not necessarily set in the middle of a vertical cross-section as shown in FIG. 7.

The "electrodeposited surface" is a surface of the electroformed layer (layer formed by electroforming) opposite to the surface 401 facing the base material, which is formed in the way electroforming proceeds.

Patent Literature 1 discloses a copper-tin alloy that constitutes elastic contact. However, since the Young's modulus of bronze (copper-tin alloy) is as low as 95 GPa as will be shown below in Comparative Example 7, the contact disclosed in Patent Literature 1 presumably had to have its elastic contact maker formed into a spiral shape so as to prevent the occurrence of instantaneous interruption. This shape presumably causes the elastic contact maker to have low versatility with a limited range of objects to which it is connected.

Furthermore, the term "instantaneous interruption" in this specification means a disruption of supply of power to an electric device for 1 microsecond or longer, and the term "instantaneous interruption characteristic" means a characteristic of suppressing the occurrence of instantaneous interruption.

On the other hand, the composition for making a contact according to one or more embodiments of the present invention is a nickel-cobalt alloy, and as such, can give a high Young's modulus. The Young's modulus is a value that depends on composition. Since nickel has such a high interatomic bonding force as to contribute to an improvement in Young's modulus and, by forming an alloy with cobalt, can further improve the Young's modulus.

On the other hand, with too high a nickel content, there is a tendency toward a fragile structure, for example, due to reaction between nickel and sulfur. With a cobalt content of 20% by weight or more, the occurrence of copper damage is observed as mentioned above.

Based on these various findings, the inventors of the present invention came up with the unique idea that in order to achieve a highly-versatile contact having necessary and sufficient contact force with a short stroke, it is necessary to have the properties of having a predetermined Young's modulus, a predetermined 0.2% proof stress, and a predetermined conductivity and having excellence in corrosion resistance and in copper damage inhibiting property (property of not causing a change in color due to copper damage), and thus completed a composition for making a contact according to one or more embodiments of the present invention.

Moreover, as a result of a trial and error process that the inventors of the present invention went through for a composition that satisfies the aforementioned properties, the inventors of the present invention found that the aforementioned properties can be satisfied by including the configuration "including: a nickel-cobalt alloy containing 1% by weight or more to less than 20% by weight of cobalt; and 0.002 part by weight or more to 0.1 part by weight or less of sulfur with respect to 100 parts by weight of the nickel-cobalt alloy, the composition having an average particle size of 0.07 μm or larger to 0.35 μm or smaller".

Use of the composition for making a contact according to one or more embodiments of the present invention can provide a highly-versatile contact that can ensure necessary and sufficient contact force with a short stroke. Therefore, the composition for making a contact can be said to have a particularly excellent constitution as a material for making a contact.

The composition for making a contact can be produced, for example, by using, for electroforming, a plating solution containing nickel, cobalt, boric acid, a surface-active agent, a brightening agent, and a surface-smoothening agent. This allows the composition for making a contact to have its average particle size adjusted to be 0.07 μm or larger and 0.35 or smaller.

An example of a condition under which the plating solution is used for electroforming is a condition under which a plating solution with a pH of 3.0 to 5.0 containing 50 g/L or more to 150 g/L or less of nickel, 1 g/L or more to 30 g/L of cobalt, 20 g/L or more to 40 g/L or less of boric acid, 0.01% by weight or more to 1% by weight or less of a surface-active agent, and a total of 0.001% by weight or more to 1% by weight or less of a brightening agent and a surface-smoothening agent is at an electric current density of 1 A/dm$^2$ or higher to 12 A/dm$^2$ or lower and a solution temperature of 40° C. or higher to 65° C. or lower with use of a DC power source.

The electroformed layer obtained by electroforming may be heat-treated. The heat treatment allows the composition for making a contact to have its average particle size controlled to 0.10 μm or larger to 0.35 μm or smaller. As a condition of the heat treatment, for example, according to one or more embodiments of the present invention, the resulting electroformed layer is heated at 150° C. or higher to 350° C. or lower for longer than 0 hour to 48 hours or shorter.

In a case where the electroformed layer is not heated, the average particle size of the composition for making a contact falls within the range of 0.07 μm or larger to 0.35μ or smaller. The heat treatment of the electroformed layer makes it possible to cause the average particle size to be 0.10 μm or larger and 0.35 μm or smaller).

An increase of the average particle size to 0.10 μm or larger and 0.35 μm or smaller within the range of 0.07 μm or larger to 0.35 μm or smaller can cause the composition for making a contact to have an improved conductivity, i.e. to exhibit a conductivity that is higher than the conductivity of the aforementioned phosphor bronze C5191-H (13% IACS).

However, even without being heat-treated, the composition for making a contact can exhibit a conductivity that is equal to the conductivity of phosphor bronze C5191-H and can exhibit a Young's modulus, a 0.2% proof stress, corrosion resistance, and copper damage inhibiting property that are required of a composition for making a contact according to one or more embodiments of the present invention. Therefore, the heat treatment is an optional step.

Usable examples of the plating solution include a NiCo sulfamic acid bath, etc. Usable examples of the surface-active agent include, but are not to be particularly limited to, sodium lauryl sulfate, polyoxyethylene lauryl ether, dodecyltrimethylammonium chloride, etc.

Further, usable examples of the brightening agent include, but are not to be particularly limited to, 1,5-sodium naphthalenedisulfonate, 1,3,6-sodium naphthalenetrisulfonate, saccharin, para-toluenesulfonamide, etc.

Usable examples of the surface-smoothening agent include, but are not to be particularly limited to, 2-butyne-1,4-diol, propargylic alcohol, coumarin, ethylene cyanohydrin, thiourea, etc.

The surface-active agent, the brightening agent, and the surface-smoothening agent may each be used alone or in combination of two or more types thereof.

The phrase "containing a total of 0.001% by weight or more to 1% by weight or less of a brightening agent and a surface-smoothening agent" means that a total of 0.001% by weight or more to 1% by weight or less of the brightening agent and the surface-smoothening agent is contained in the plating solution. The ratio between the brightening agent and the surface-smoothening agent is not to be particularly limited.

In the following, an example of a set of steps of the electroforming is described with reference to FIG. 1. FIG. 1 is a set of cross-sectional views schematically showing steps of a process by which a composition for making a contact is produced by electroforming.

A matrix 11 is obtained by laminating a thick insulating layer 14 on a flat upper surface of the conducting base material 13, and the insulating layer 14 is provided with a cavity 15 (recessed area) having a shape of a reversed pattern of the composition 12 for making a contact. The cavity 15 has no insulating layer 14 left on its bottom surface, and the conducting base material 13 has its upper surface exposed by the bottom surface of the cavity 15 as a whole.

In the cavity 15 of the matrix 11, the composition 12 is formed by electroforming. Usable examples of the conducting base material 13 include, but are not to be particularly limited to, conventional publicly-known copper (e.g., tough pitch copper C1100 manufactured by HARADA METAL INDUSTRY Co., Ltd., etc.), SUS (e.g., SUS304 manufactured by HAKUDO Corporation, etc.), etc.

In the following, steps of a process by which the composition 12 is produced by using the matrix 11 are described. FIG. 1 shows steps of a process by which the composition 12 is produced by electroforming. (a) through (f) of FIG. 1 show a step (matrix-forming step) of forming the matrix 11. (g) and (h) of FIG. 1 show a step (electrodepositing step) of producing the composition 12 by electrodepositing metal in the cavity 15. (i) and (j) of FIG. 1 show a step (removing step) of removing the composition 12 from the matrix 11.

In actuality, the matrix 11 is provided with a plurality of cavities 15 so that a plurality of compositions 12 for making a contact are produced at one time. However, for convenience sake, a case where a single composition 12 for making a contact is produced is described.

(a) of FIG. 1 shows a conducting base material 13, made of metal, whose upper surface is flat, and the conducting base material 13 has at least its upper surface treated so that a composition 12 electrodeposited thereon can be easily removed.

In the matrix-forming step, first, as shown in (b) of FIG. 1, a dry film photoresist 16 is laminated on the upper surface of the conducting base material 13 by a laminator.

Next, as shown in (c) of FIG. 1, the dry film photoresist 16 is exposed with a mask 17 covering a region of the dry film photoresist 16 in which a cavity 15 is formed.

Since the exposed region of the dry film photoresist 16 becomes insoluble and therefore does not dissolve during development, only the region covered with the mask 17 is dissolved and removed by development, whereby a cavity 15 is formed in the dry film photoresist 16 as shown in (d) of FIG. 1.

Finally, as shown in (e) of FIG. 1, the dry film photoresist 16 is further exposed to form an insulating layer 14 having a predetermined thickness on the upper surface of the conducting base material 13. The matrix 11 thus obtained is shown in (f) of FIG. 1.

Suitably usable examples of the dry film photoresist 16 include, but are not to be particularly limited to, FRA517 and SF100 manufactured by DuPont MRC, HM-4056 manufactured by Hitachi Chemical Co., Ltd., NEF150K and NIT215 manufactured by Nichigo-Morton, etc.

Although only the upper surface of the conducting base material 13 is covered with the insulating layer 14 in FIG. 1, the conducting base material 13, in actuality, has its lower and side surfaces covered with an insulating layer so that no metal is electrodeposited outside of the cavity 15.

Figure 2:
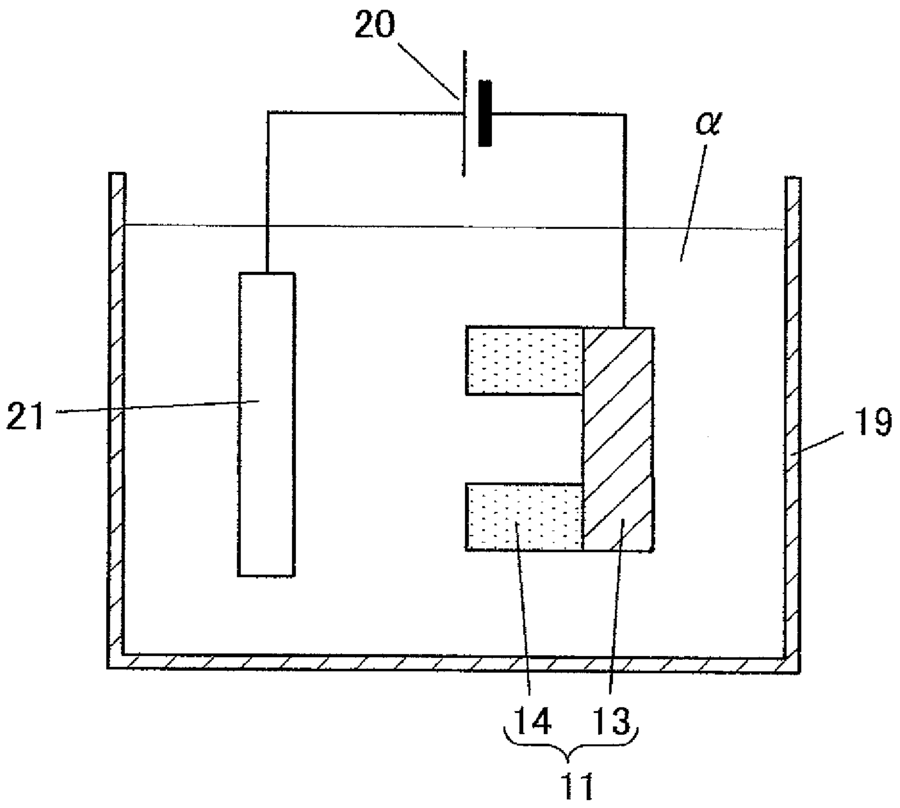
FIG. 2 is a cross-sectional view showing a matrix placed in an electrolytic cell.

FIG. 2 is a cross-sectional view showing a matrix placed in an electrolytic cell. As shown in FIG. 2, the electrodepositing step includes placing the matrix 11 in an electrolytic cell 19, applying a voltage between the matrix 11 and a counter electrode 21 through a DC power source 20, and passing an electric current through a plating solution a.

In order for the resulting composition 12 to contain a nickel-cobalt alloy containing 1% by weight or more to 20% by weight or less of cobalt and 0.002 part by weight or more to 0.1 part by weight or less of sulfur with respect to 100 parts by weight of the nickel-cobalt alloy, according to one or more embodiments of the present invention, the plating solution $\alpha$ contains 50 g/L or more to 150 g/L or less of nickel, 1 g/L or more to 30 g/L or less of cobalt, 20 g/L or more to 40 g/L or less of boric acid, 0.01% by weight or more to 1% by weight or less of a surface-active agent, and a total of 0.001% by weight or more to 1% by weight or less of a brightening agent and a surface-smoothening agent and have a pH of 3.0 or greater to 5.0 or less.

Upon the start of conduction, the metal ions in the plating solution $\alpha$ are electrodeposited on the surface of the conducting base material 13, whereby a metal layer 18 is deposited. On the other hand, since the insulating layer 14 stops an electric current from passing therethrough, no metal is electrodeposited directly on the insulating layer 14 even when a voltage is applied between the matrix 11 and the counter electrode 21.

For this reason, as shown in (g) of FIG. 1, the metal layer 18 grows inside of the cavity 15 from the bottom surface in the direction of voltage application (i.e., in the way electroforming proceeds).

Figure 3:
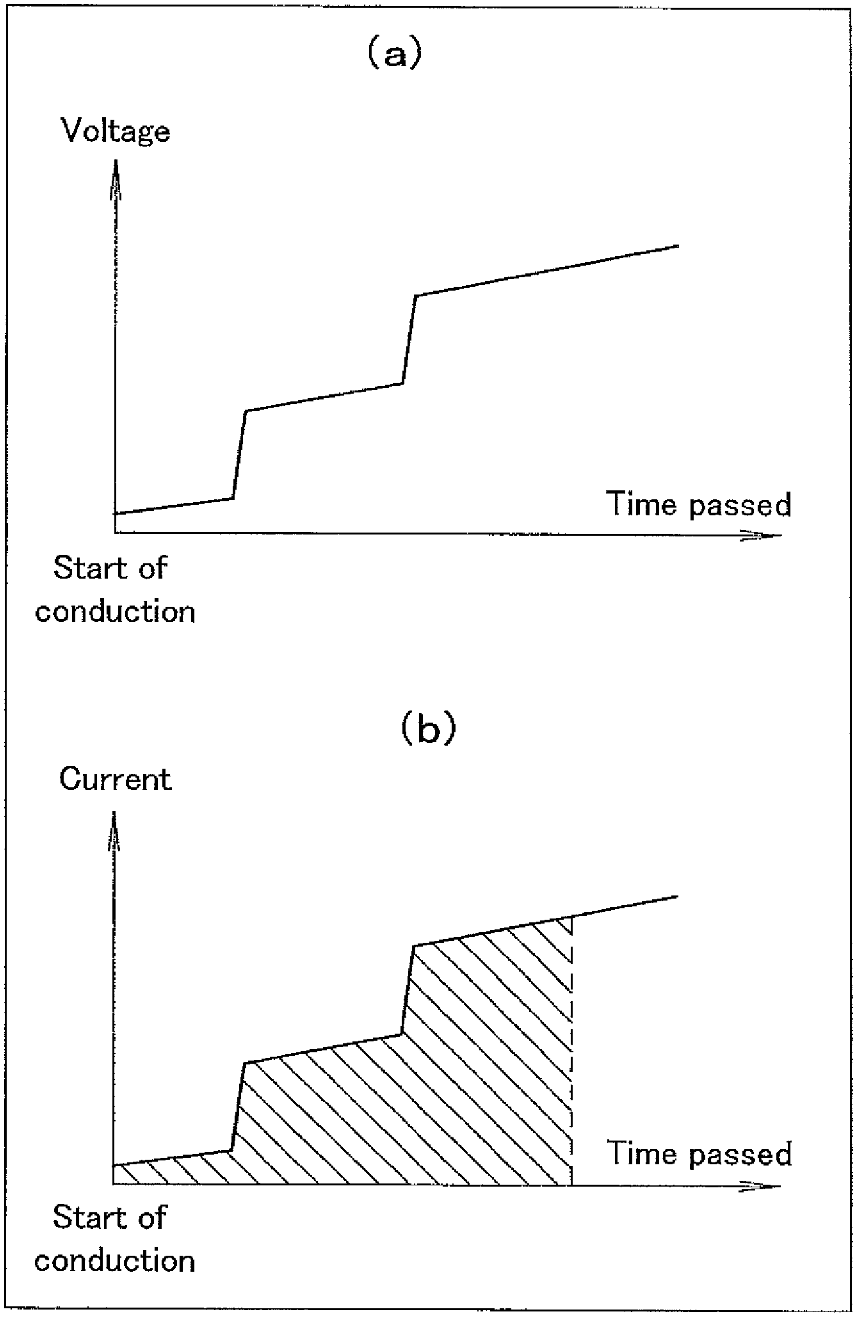
FIG. 3 shows (a) changes in voltage that is applied between the electrodes of the electrolytic cell and (b) changes in electric current that is passed through the electrolytic cell.

The thickness of the metal layer 18 (composition 12 for making a contact) thus electrodeposited is controlled by the integrated amount of the electric current passed (i.e., the time-integrated amount of the electric current passed, which corresponds to the area of the shaded region in (b) of FIG. 3).

The reason for this is as follows: Since the amount of metal that is deposited per unit time is proportional to the value of an electric current, the volume of the metal layer 18 depends on the integrated amount of the electric current passed, and the thickness of the metal layer 18 can be determined from the integrated amount of the electric current passed.

FIG. 3 shows (a) changes in voltage that is applied between the electrodes of the electrolytic cell and (b) changes in electric current that is passed through the electrolytic cell.

For example, assuming that the voltage of the DC power source 20 gradually increases as shown in (a) of FIG. 3 as time passes after the start of conduction, the electric current flowing between the counter electrode 21 and the matrix 11 also gradually increases as shown in (b) of FIG. 3 as time passes after the start of conduction.

Then, when reaching of the intended thickness by the metal layer 18 has been detected by monitoring the integrated amount of the electric current passed, the DC power source 20 is turned off to stop conduction. In the result, as shown in (h) of FIG. 1, a composition 12 for making a contact is cast in the cavity 15 by the metal layer 18 having the desired thickness.

Once the composition 12 has been cast, the insulating layer 14 is removed by etching or the like as shown in (i) of FIG. 1, and the composition 12 is removed from the conducting base material 13 as shown in (j) of FIG. 1, whereby the composition 12 is obtained in the form of a reversal of the shape of the matrix 11.

By being produced by electroforming, the composition 12 for making a contact has its average particle size adjusted to be 0.07 μm or larger and 0.35 μm or smaller. Heat treatment of the composition 12 for making a contact allows the composition 12 for making a contact to have its average particle size adjusted to be 0.10 μm or larger and 0.35 μm or smaller.

It should be noted here that a contact according to one or more embodiments of the present invention to be described later can be made by forming the cavity 15 in advance into the shape of the contact. The shape of the contact is not to be particularly limited.

Since the composition for making a contact according to one or more embodiments of the present invention can ensue necessary and sufficient contact force with a short stroke, a contact containing the composition for making a contact can easily provide a contact in a desired shape without the need to take a unique shape such as a spiral shape to ensure contact force.

(2. Contact)

A contact according to one or more embodiments of the present invention includes: a retaining section fixed by an insulator; a contact section which makes sliding contact with a conductive member; and an elastic deformation section which connects the retaining section and the contact section to each other and which is elastically deformable, at least the elastic deformation section containing a composition for making a contact according to one or more embodiments of the present invention.

Figure 4:
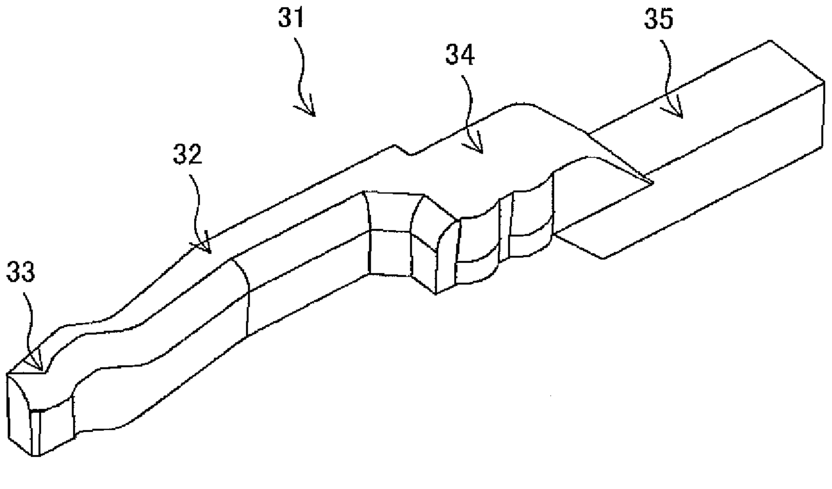
FIG. 4 is an appearance perspective view showing an example of the appearance of a contact according to one or more embodiments of the present invention.

FIG. 4 is an appearance perspective view showing an example of the appearance of a contact according to one or more embodiments of the present invention. In FIG. 4, the contact 31 includes an elastic deformation section 32, a contact section 33, a retaining section 34, and an electrode section 35. Since the elastic deformation section 32 contains a composition for making a contact according to one or more embodiments of the present invention, necessary and sufficient contact force is ensured with a short stroke.

Therefore, the contact 31 has a high level of vibration followability and thus keeps a satisfactory level of contact with a conductive member to which it is connected. Further, the contact 31 does not need to take a unique shape such as a spiral shape and can take any shape for any purpose, and as such, can be connected to a variety of conductive members.

The elastic deformation section 32 may be composed solely of a composition for making a contact according to one or more embodiments of the present invention or may contain another component as long as the Young's modulus, 0.2 proof stress, conductivity, corrosion resistance, and copper damage inhibiting property of the elastic deformation section 32 are not impaired.

Examples of cases where the elastic deformation section 32 contains another component include a case where the elastic deformation section 32 has its surface plated with another metal and a case where the elastic deformation section 32 contains the aforementioned surface-active agent, brightening agent, surface-smoothening agent, etc.

Since, in the contact 31, at least the elastic deformation section 32 needs only contain a composition for making a contact according to one or more embodiments of the present invention, the contact section 33 and the retaining section 34 may each be composed of a component not containing a composition for making a contact according to one or more embodiments of the present invention. For example, the contact section 33 and the retaining section 34 may each be composed, for example, of Fe, Cu, Mn, Zn, Sn, Pd, Au, or Ag, etc.

As such, the elastic deformation section 32 may be made of a different material from the contact section 33 and the retaining section 34. However, in a case where the contact 31 is made by electroforming, according to one or more embodiments of the present invention, in view of simplification of making, the elastic deformation section 32, the contact section 33, and the retaining section 34 are made of an identical material, so that the elastic deformation section 32, the contact section 33, and the retaining section 34 can be integrally formed at one time as shown in FIG. 4.

The elastic deformation section 32 connects the contact section 33 and the retaining section 34 to each other. This "connection" includes, for example, a case where the elastic deformation section 32, the contact section 33, and the retaining section 34 be integrally formed by an identical material as shown in FIG. 4.

This "connection" further includes a case where the elastic deformation section 32 is joined by a technique such as welding to the contact section 33 and the retaining section 34 each composed of a component not containing a composition for making a contact according to one or more embodiments of the present invention.

The term "elastically deformable" means that the elastic deformation section 32 is predisposed to recover from a strain caused by application of external force. The elastic deformation section 32 is not to be particularly limited in shape.

Figure 5:
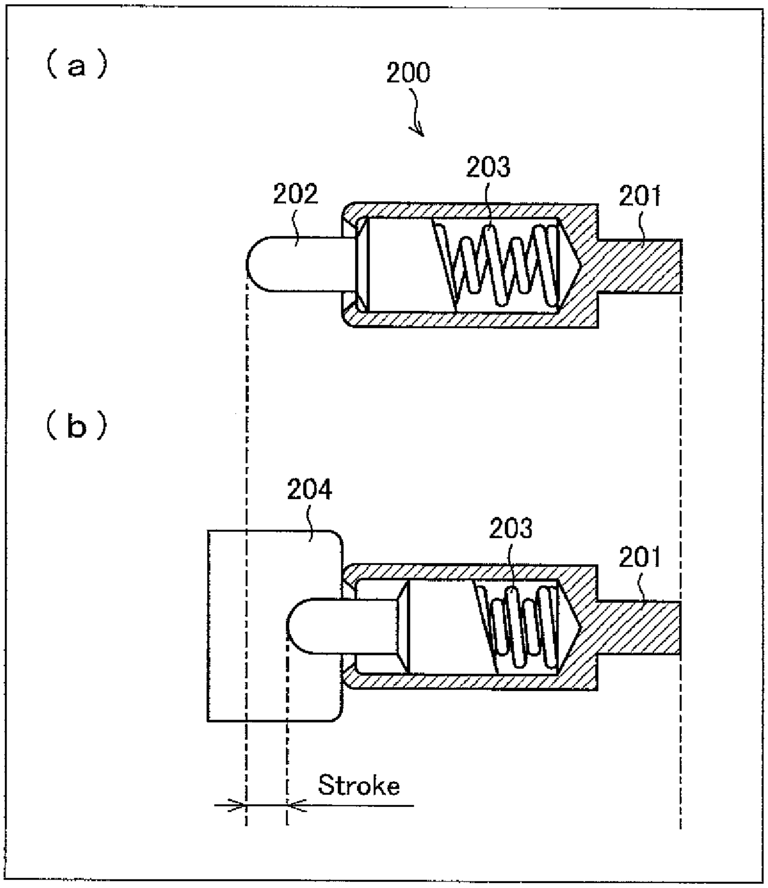
FIG. 5 is a vertical cross-sectional view showing an example of a contact of a common battery connector.
Figure 6:
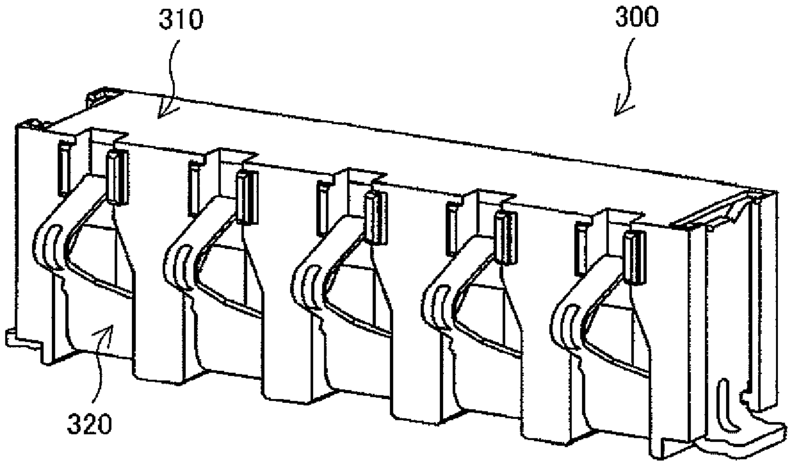
FIG. 6 is an appearance perspective view showing an example of the appearance of a conventional publicly-known battery connector.

For example, the elastic deformation section 32 may take such a shape as that shown in FIG. 4, may take a spring shape as does the elastic deformation section 203 of FIG. 5, or may take a leaf shape, a coil spring shape, or the like as in a contact 320 of FIG. 6. Further, the direction of elastic deformation is not to be particularly limited. It should be noted that FIG. 6 is an appearance perspective view showing an example of the appearance of a conventional publicly-known battery connector 300 including a connector housing 310 made of an insulator and contacts 320.

The elastic deformation section 32 is biased toward elastic deformation when the contact section 33 makes sliding contact with a conductive member to which the contact 31 is connected, and retains the connection between the contact 31 and the conductive member. Since the contact 31 can take any shape for any purpose and can be connected to a variety of conductive members, the conductive member is not to be particularly limited. Examples of the conductive member include an electrode of a battery, a connection part of a substrate, etc.

The contact 31 is configured such that the composition for making a contact according to one or more embodiments of the present invention as contained in the elastic deformation section is produced by electroforming and, according to one or more embodiments of the present invention, is one obtained by heat-treating an electroformed layer obtained.

The contact 31 may for example be a contact, formed by bending a metal plate made of a composition for making a contact according to one or more embodiments of the present invention, whose elastic force has been adjusted by partly changing the thickness by press working.

However, such press working causes residual stress, lattice defects, etc. to occur to result in deterioration in mechanical properties, and this may shorten the life of a connector including the contact 31 or cause variations in elastic force from product to product (Japanese Patent Application Publication, Tokukai, No. 2008-262780 A).

On the other hand, since electroforming is an electrochemical reaction and is a technique for causing a metal to be deposited electrically, a contact having a uniform structure can be made without the occurrence of residual stress, lattice defects, etc.

Further, unlike a method such as cutting work, electroforming allows a desired shape to be formed simply by forming a reversed pattern of the shape of a contact in the aforementioned cavity. For example, by forming a reversed pattern of a shape extending along a direction substantially perpendicular to the direction of voltage application of electroforming, the contact can be made shorter along a direction in which it is fitted. This brings about an advantage of making the contact smaller in size.

An example of a method for making a contact by electroforming is a method for obtaining an electroformed layer in the shape of a contact by employing a method of FIG. 1 with use of (i) a plating solution with a pH of 3.0 or greater to 5.0 or less containing 50 g/L or more to 150 g/L or less of nickel, 1 g/L or more to 30 g/L of cobalt, 20 g/L or more to 40 g/L or less of boric acid, 0.01% by weight or more to 1% by weight or less of a surface-active agent, and a total of 0.001% by weight or more to 1% by weight or less of a brightening agent and a surface-smoothening agent and (ii) a cavity in the shape of a reversed pattern of the desired shape.

This allows the composition for making a contact according to one or more embodiments of the present invention as contained in a contact to include: a nickel-cobalt alloy containing 1% by weight or more to less than 20% by weight of cobalt; and 0.002 part by weight or more to 0.1 part by weight or less of sulfur with respect to 100 parts by weight of the nickel-cobalt alloy, the composition having an average particle size of 0.07 μm or larger to 0.35 or smaller.

Further, according to one or more embodiments of the present invention, the method for making a contact by electroforming includes a heating step of heating the electroformed layer. An example of the heating step is a heating step of heating, at 150° C. or higher to 350° C. or lower for longer than 0 hour to 48 hours or shorter, the electroformed layer obtained in the electroforming step. This allows the average particle size to be 0.10 μm or larger and 0.35 μm or smaller.

The unit "g/L" of the amounts of nickel, cobalt, and boric acid added represents the number of grams of nickel, cobalt, and boric acid contained in 1 L of the plating solution, respectively. The unit "% by weight" of the amount of the surface-active agent represents the percent by weight of the surface-active agent with respect to the weight of the plating solution, and the unit "% by weight" of the amount of the brightening agent and the surface-smoothening agent represents the percent by weight of a total amount of the brightening agent and the surface-smoothening agent with respect to the weight of the plating solution.

(3. Electronic Component)

A contact according to one or more embodiments of the present invention can exhibit necessary and sufficient contact force with a short stroke since the composition for making a contact according to one or more embodiments of the present invention is high in Young's modulus, in 0.2% proof stress, in conductivity, in corrosion resistance, and in copper damage inhibiting property. As such, the contact can be low in height and small in size while ensuring necessary contact force. Further, since the contact can be in a highly-versatile shape, it can be applied to a variety of conductive members (electronic components) with no limit on the range of objects to which it is connected.

Since the contact according to one or more embodiments of the present invention is highly versatile, it can be applied to a wide range to electronic components such as connectors and switches.

(3-1. Connector)

A contact according to one or more embodiments of the present invention can be applied to a connector. The connector is not to be particularly limited, and can be used as a connector for various purposes.

Examples of connectors include battery connectors, connectors for computer use such as USB connectors, connectors for communication use such as DS connectors, audio-visual connectors such as phone connectors, power connectors such as AC power connectors, coaxial connectors for connecting coaxial cables, optical connectors for connecting optical cables, etc.

Since the composition for making a contact according to one or more embodiments of the present invention exhibits excellence in Young's modulus, in 0.2% proof stress, in conductivity, in corrosion resistance, and in copper damage inhibiting property, it is possible to ensure necessary and sufficient contact force with a short stroke and have a versatile shape.

Therefore, the connector can be used, regardless of application, as a connector which has a high level of vibration followability and which can ensure an instantaneous interruption characteristic.

The connector needs only include a contact according to one or more embodiments of the present invention, and can include another component that has conventionally been publicly known. For example, the connector may include a connector housing, etc., made of a conventional publicly-known insulator, which serves to fix the retaining section of the contact. Further, a method for making such a connector is not to be particularly limited, and the connector can be made by a conventional publicly-known method.

(3-2. Switch)

A contact according to one or more embodiments of the present invention can be applied to a switch. The switch is not to be particularly limited, and can be used as a switch for various purposes. Examples of the switch include an operation switch, a slide switch, a detection switch, etc. Since the composition for making a contact according to one or more embodiments of the present invention exhibits excellence in Young's modulus, in 0.2% proof stress, in conductivity, in corrosion resistance, and in copper damage inhibiting property, it is possible to ensure necessary and sufficient contact force with a short stroke and have a versatile shape.

Therefore, the switch can be used, regardless of application, as a switch which has a high level of vibration followability and which can ensure an instantaneous interruption characteristic.

The switch needs only include a contact according to one or more embodiments of the present invention, and can include another component that has conventionally been publicly known. For example, the connector may include a switch housing, etc., made of a conventional publicly-known insulator, which serves to fix the retaining section of the contact. Further, a method for making such a switch is not to be particularly limited, and the connector can be made by a conventional publicly-known method.

The present invention encompasses at least the following:

That is, a composition for making a contact according to one or more embodiments of the present invention includes: a nickel-cobalt alloy containing 1% by weight or more to less than 20% by weight of cobalt; and 0.002 part by weight or more to 0.1 part by weight or less of sulfur with respect to 100 parts by weight of the nickel-cobalt alloy, the composition having an average particle size of 0.07 μm or larger to 0.35 μm or smaller.

As will be discussed below in the Examples, the inventors of the present invention extensively investigated correlations between the amount of cobalt that is contained in the nickel-cobalt alloy included in the composition for making a contact, the amount of sulfur that is contained in the composition for making a contact, and the average particle size of the composition for making a contact and Young's modulus, 0.2% proof stress, conductivity, corrosion resistance, and change in color due to copper damage.

As a result, the inventors of the present invention found that in a case where the composition for making a contact has the foregoing configuration, it exhibits excellence in Young's modulus, in 0.2% proof stress, in conductivity, and in corrosion resistance and does not exhibit a change in color due to copper damage, and that such a composition is suitable for providing a versatile contact which is small in stroke and which can give necessary and sufficient contact force.

Therefore, the foregoing configuration makes it possible to provide a useful material for achieving a highly-versatile contact that can ensure necessary and sufficient contact force with a short stroke.

The composition for making a contact according to one or more embodiments of the present invention is configured such that the average particle size is 0.10 μm or larger and 0.35 μm or smaller.

As will be shown below in the Examples, the composition thus configured to have such an average particle size can exhibit the properties of exhibiting a high Young's modulus, a high 0.2% proof stress, and high corrosion resistance and not exhibiting a change in color due to copper damage, and can also exhibit a conductivity (14% IACS or higher) that is higher than the conductivity of phosphor bronze C5191-H, which is used for a common conductive contact.

As such, the composition for making a contact can be more suitably used as a material for achieving a highly-versatile contact that can ensure necessary and sufficient contact force with a short stroke.

The composition for making a contact according to one or more embodiments of the present invention is configured such that the sulfur is contained in 0.002 part by weight or more to 0.05 part by weight or less with respect to 100 parts by weight of the nickel-cobalt alloy.

As will be shown below in the Examples, the composition thus configured to contain such an amount of sulfur can exhibit a high Young's modulus, a high 0.2% proof stress, and a high conductivity, exhibit an excellent result on a salt spray test, which is a type of corrosion resistance test, and exhibit the properties of not exhibiting a change in color due to copper damage, and can also exhibit a better result on a mixed gas test, which is a type of corrosion resistance test.

As such, the composition for making a contact can be more suitably used as a material for achieving a highly-versatile contact that can ensure necessary and sufficient contact force with a short stroke.

A contact according to one or more embodiments of the present invention includes: a retaining section fixed by an insulator; a contact section which makes sliding contact with a conductive member; and an elastic deformation section which connects the retaining section and the contact section to each other and which is elastically deformable, at least the elastic deformation section containing a composition for making a contact according to one or more embodiments of the present invention.

According to the configuration, at least the elastic deformation section contains a composition for making a contact according to one or more embodiments of the present invention. This makes it possible to provide a contact which can ensure necessary and sufficient contact force in a versatile shape, without the need to take a unique shape such as a spiral shape such as the one shown in Patent Literature 1, and which exhibits a short stroke.

This in turn makes it possible to provide a highly-versatile contact which can be low in height and small in size, which can be used in a variety of targets of connection, and which has improved vibration followability to keep a satisfactory level of contact.

The contact according to one or more embodiments of the present invention is configured such that the composition is one obtained by electroforming.

Unlike a method such as press working, for example, electroforming allows an adjustment of elastic force of a metal plate without causing variations in elastic force from product to product dues to the occurrence of residual stress, lattice defects, etc. Further, electroforming makes it comparatively easy to make a small-sized contact.

Therefore, the foregoing configuration makes it possible to uniformly and efficiently provide highly-versatile contacts that can ensure necessary and sufficient contact force with a short stroke.

The contact according to one or more embodiments of the present invention is configured such that the composition is one obtained by heating, at 150° C. or higher to 350° C. or lower for longer than 0 hour to 48 hours or shorter, an electroformed layer made by electroforming.

The heating allows the composition for making a contact to have a larger average particle size within the range of 0.07 μm or larger to 0.35 μm or smaller than it would do if the heating were not carried out.

Since the average particle size is correlated with the conductivity, the heat treatment allows the composition for making a contact to keep the properties of exhibiting a high Young's modulus, a high 0.2% proof stress, and high corrosion resistance and not exhibiting a change in color due to copper damage and to exhibit a higher conductivity than does a composition for making a contact as obtained without carrying out the heat treatment.

Therefore, the foregoing configuration makes it possible to provide a highly-conducting, highly-versatile contact that can ensure necessary and sufficient contact force with a short stroke.

An electronic component according to one or more embodiments of the present invention includes a contact according to one or more embodiments of the present invention. The contact according to one or more embodiments of the present invention can ensure necessary and sufficient contact force with a short stroke without the need to take a unique shape such as the spiral shape.

Therefore, the foregoing configuration makes it possible to provide a highly-versatile electronic component that can be low in height and small in size. For example, such an electronic component can be suitably used as a contact having a plate spring shape or a coil shape, such as an FPC connector, a substrate-to-substrate connector, a battery connector, an operation switch, a slide switch, and a detection switch.

A method for making a contact according to one or more embodiments of the present invention includes an electroforming step of obtaining an electroformed layer by electroforming in a plating solution with a pH of 3.0 or greater to 5.0 or less containing 50 g/L or more to 150 g/L or less of nickel, 1 g/L or more to 30 g/L of cobalt, 20 g/L or more to 40 g/L or less of boric acid, 0.01% by weight or more to 1% by weight or less of a surface-active agent, and a total of 0.001% by weight or more to 1% by weight or less of a brightening agent and a surface-smoothening agent.

The foregoing configuration causes the electroformed layer to be obtained by a simple method as a contact containing the composition for making a contact according to one or more embodiments of the present invention.

This makes it possible to easily make a highly-versatile contact that, what is more, can ensure necessary and sufficient contact force with a short stroke.

The method for making a contact according to one or more embodiments of the present invention is configured to further include a heating step of heating, at 150° C. or higher to 350° C. or lower for longer than 0 hour to 48 hours or shorter, the electroformed layer obtained in the electroforming step.

By further including the heating step, the configuration allows the composition for making a contact that is contained in the contact to have a larger average particle size within the range of 0.07 μm or larger to 0.35 μm or smaller than it would do if the heating were not carried out.

Since the average particle size is correlated with the conductivity, the heat treatment allows the resulting contact to have the properties of exhibiting a high Young's modulus, a high 0.2% proof stress, and high corrosion resistance and not exhibiting a change in color due to copper damage and to have a higher conductivity than does a contact obtained without carrying out the heat treatment.

Therefore, the foregoing configuration makes it possible to provide a highly-conducting, highly-versatile contact that can ensure necessary and sufficient contact force with a short stroke.

EXAMPLES

In the following, one or more embodiments of the present invention is described in more detail with reference to the Examples. It should be noted, however, that the present invention is not to be limited to the following Examples.

<Measurement Methods>

(Measurement of Weight Ratio Between Nickel and Cobalt and Sulfur Content)

The weight ratio between nickel and cobalt of the nickel-cobalt alloy contained in a composition for making a contact was measured with a X-ray fluorescence spectrometer (XDV-SD; manufactured by Fisher Instruments). The amount of sulfur that is contained in a composition for making a contact was measured with EMIA-920V (manufactured by Eloriba, Ltd.) according to "Infrared absorption method after high-frequency heating and combustion in oxygen flow".

(Measurement of Average Particle Size)

A cross-section of a composition for making a contact was processed with a focused ion beam by using a focused ion beam scanning ion microscope (FB-2100, manufactured by Hitachi High-Technologies Corporation). After that, the scanning ion microscope was used to observe crystal grains contained in an area of 10 μm×10 μm along a through-thickness direction from an electrodeposited surface 400 of the composition for making a contact (with a magnification of 50000) (see FIG. 7).

Then, the average particle size was obtained by counting the numbers of grains completely cut by segment of known lengths on an FIB photograph by a cutting method described in JIS-H0501 "Methods for estimating average grain size of wrought copper and copper alloys" and calculating an average of the cut lengths.

(Measurement of Young's Modulus and 0.2% Proof Stress)

In each of the Examples and Comparative Examples, the Young's modulus and 0.2% proof stress of a composition for making a contact were measured by conducing a tensile test according to the shape and size of a test piece, the apparatus, and the test condition as set forth in JIS Z2241 "Methods of tensile test for metallic materials".

The variation of load (N) was measured by putting seal gauge lines (manufactured by Shimadzu Corporation) on a size 13B test piece so that they are located at a gauge length (L) of 20 mm to 30 mm, placing the test piece on an Autograph (manufactured by Shimadzu Corporation), and conducting a test at a speed of 2 mm/min in a tensile direction. The extension was measured with a video extensometer (manufactured by Shimadzu Corporation) by following the amount of change ($1=L+\Delta L$) in seal distance between the gauge marks.

The stress change ($M=N/A\times 100$) was calculated by dividing the variation of load by the sample cross-section area (A), and the elongation strain ($\sigma=1/L$) was calculated by dividing the amount of change in extension by the gauge length. A stress-strain curve was calculated from the stress change and the elongation strain.

The Young's modulus was calculated as the tilt of a line approximate to a straight line in a region of the stress-strain curve where the extension is low. The 0.2% proof stress was calculated by drawing a straight line tilted at the Young's modulus from the strain and finding a point of intersection between the straight line and the stress-strain curve.

(Measurement of Conductivity)

In conformity to the average cross-section method described in JIS H0505 "Measuring methods of electrical resistivity and conductivity of non-ferrous materials", the volume resistivity ($\rho=RA/L$) was calculated from the average cross-section area (A) and the measurement distance (L) by calculating the electrical resistivity (R) of the test piece with a resistance-measuring instrument Σ5 (manufactured by NPS).

The conductivity was obtained by expressing in percentage the quotient which is obtained by dividing the volume resistivity of $1.7241\times10^{-2}$ μΩm of standard annealed copper by the volume resistivity.

(Measurement of Corrosion Resistance)

The corrosion resistance of a composition for making a contact was measured by carrying out a neutral salt spray test and a mixed gas test as described in JIS 118502 "Methods of corrosion resistance test of metallic coatings".

<Neutral Salt Spray Test>

With use of a salt wetting and drying combined cycle tester CYP-90 (manufactured by Suga Test Instruments Co., Ltd.), corrosion resistance was examined by repeatedly exposing the sample to a sequence of atmospheres, namely an atmosphere in which a neutral sodium chloride 5±1% solution at 35±2° C. is sprayed onto the sample, an atmosphere in which the sample is dried, and an atmosphere in which the sample is wetted and, 48 hours after the start of exposure, visually checking the sample surface with a rating number standard chart.

<Mixed Gas Test>

With use of a gas corrosion tester GLP-91C (manufactured by Yamasaki Seiki Co., Ltd.), corrosion resistance was examined by exposing the sample to an atmosphere of a mixed gas of 3 ppm of hydrogen sulfide and 10 ppm of sulfur dioxide (at a temperature of 40±2° C. with a humidity of 75±3% RH) and, 96 hours after the start of exposure, visually checking the sample surface with the rating number standard chart.

(Copper-Damage Color-Change Test)

With use of a polyimide sealing resin (SEALING RESIN; manufactured by Sigma-Aldrich), a change in color of the object to be measured was visually observed after dropping 0.1 ml of liquid onto the object with a dropper, raising the temperature from normal temperature to 200° C. at 5° C./min, and keeping the temperature at 200° C. for 10 minutes.

With glass as a reference sample, the samples with different colors from the color of the polyimide on the glass were judged to have suffered from copper damage.

Example 1

Preparation of a Composition for Making a Contact

SUS304 (manufactured by HAKUDO Corporation) was used as a conducting base material made of SUS. On a surface of the conducting base material, NEF150K manufactured by Nichigo-Morton Co., Ltd. was evenly laminated as a dry film photoresist by using a laminator.

The photoresist was exposed with a mask pattern as a mask and developed. After that, the photoresist was further exposed, whereby a matrix having a mask pattern (reversed pattern) was formed.

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 5 g/L or more to 17 g/L or less (Co=1 g/L or more to 3 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 0.001% by weight or more to 0.03% by weight or less of saccharin was used. A plating bath was prepared by filling an electrolytic cell with the plating solution.

The matrix was placed in the electrolytic cell, and electroforming was carried out with the plating bath set at a temperature of 40° C. or higher to 65° C. or lower and at an electric current density of 1 A/dm$^2$ or higher to 12 A/dm$^2$ or lower. After that, the resulting electroformed layer was taken out from the electrolytic cell, whereby a composition 1 for making a contact was obtained.

The results of Example 1 are shown in Table 1. the composition 1 thus obtained in Example 1 contained a nickel-cobalt alloy containing 1% by weight of cobalt and 99% by weight of nickel and 0.002 part by weight of sulfur with respect to 100 parts by weight of the nickel-cobalt alloy. The composition 1 had an average particle size of 0.07 μm.

With a Young's modulus of 190 GPa or higher and a 0.2% proof stress of 560 MPa or higher, the composition for making a contact has a Young's modulus that is equal to or higher than the Young's modulus of SUS304, which is used as a With a Young's modulus of 190 GPa or higher and a 0.2% proof stress of 560 MPa or higher, the composition for making a contact has a Young's modulus that is equal to or higher than the Young's modulus of SUS304, which is used as a high-strength spring material for a common electronic component, and a 0.2% proof resistance that is equal to or higher than the 0.2% proof stress of phosphor bronze C5191-H, which is used as a common spring material, and therefore makes it possible to fabricate a contact that, even with a short stroke, has necessary and sufficient contact force required of a contact and give the contact a high level of vibration followability.

Further, if five of five samples of a composition for making a contact show "no rust" thereon as a result of the salt spray test, the composition can be used even in a hot and humid environment, and can therefore be said to have sufficient corrosion resistance to be used as a material for a versatile contact.

Furthermore, if five of five samples of a composition for making a contact show "no rust" thereon as a result of the mixed gas test, the composition can be used even in a stringent environment where a combustion gas component is contained in the atmosphere, and can therefore be said to have more preferable corrosion resistance to be used as a material for a versatile contact.

That is, if five out of five samples show "no rust" thereon as a result of the salt spray test, the composition can be said to exhibit practically sufficient corrosion resistance. Meanwhile, if five out of five samples show "no rust" thereon as a result of the mixed gas test, the composition can be said to exhibit sufficient corrosion resistance even in an unusual environment such as a chemical factory or a volcano, and can therefore said to have more preferable corrosion resistance.

Moreover, if five out of five samples composition for making a contact suffer from no copper damage as a result of the copper-damage color-change test, the composition can be said to have a sufficient copper damage inhibiting property.

Furthermore, with a conductivity of 13% IACS or higher, the composition for making a contact has a conductivity that is equal to or higher than that of phosphor bronze C5191-H (conductivity: 13% IACS), which is used for a common conductive contact, and can therefore be said to have sufficient conductivity to allow passage of electricity at low heat.

Based on the above findings, the Examples and the Comparative Examples employ the following criteria for judgment: a Young's modulus of 190 GPa or higher; a 0.2% proof stress of 560 MPa or higher; a conductivity of 13% IACS or higher; no rust on five out of five samples in salt spray test (indicated "5/5 no rust" in the tables); no rust on five out of five samples in mixed gas test (indicated "5/5 no rust" in the tables); and no copper damage to five out of five samples in copper-damage color-change test (indicated "5/5 no color change" in the tables).

It should be noted "Proportion of Co in Alloy (wt %)" as used in Tables 1 to 5 indicates the percent by weight of cobalt in the nickel-cobalt alloy contained in a composition for making a contact.

As shown in Table 1, the composition 1 obtained in Example 1 had a Young's modulus of 191 GPa, a 0.2% proof stress of 586 MPa, and a conductivity of 16% IACS. Further, as for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

TABLE 1

| | | Criteria for Judgment | Example 1 | Example 2 | Example 3 | Example 4 | Example 5 | Example 6 | Example 7 | Example 8 | Example 9 |
|---|---|---|---|---|---|---|---|---|---|---|---|
| Proportion of Co in Alloy (wt %) | | NA | | | | | 1 | | | | |
| Sulfur Content (parts by weight) | | NA | | 0.002 | | | 0.05 | | | 0.1 | |
| Average Particle Size (μm) | | NA | 0.07 | 0.10 | 0.35 | 0.07 | 0.10 | 0.35 | 0.07 | 0.10 | 0.35 |
| Young's Modulus (GPa) | | 190 or higher | 191 | 190 | 193 | 195 | 191 | 191 | 191 | 194 | 196 |
| 0.2% Proof Stress (MPa) | | 560 or higher | 586 | 583 | 560 | 802 | 799 | 730 | 818 | 810 | 744 |
| Conductivity (% IACS) | | 13 or higher | 16 | 16 | 18 | 16 | 16 | 18 | 16 | 16 | 18 |
| Corrosion Resistance | Salt Spray | 5/5 No Rust | 5/5 | 5/5 | 5/5 | 5/5 | 5/5 | 5/5 | 5/5 | 5/5 | 5/5 |
| | Mixed Gas | 5/5 No Rust | 5/5 | 5/5 | 5/5 | 5/5 | 5/5 | 5/5 | 4/5 | 4/5 | 4/5 |
| Change in Color due to Copper Damage | | 5/5 No Color Change | 5/5 | 5/5 | 5/5 | 5/5 | 5/5 | 5/5 | 5/5 | 5/5 | 5/5 |

Example 2

Electroforming was carried out with a plating solution identical in condition to that of Example 1 by using a matrix identical to that of Example 1 under the same conditions as those for Example 1. After that, the resulting electroformed layer was taken out from the electrolytic cell, placed into a constant-temperature bath whose inner temperature had been kept at 180° C. or higher to 230° C. or lower, and heat-treated by being left in the constant-temperature bath for 0.1 hour or longer to 3 hours or shorter, whereby a composition 2 for making a contact was obtained.

As shown in Table 1, the composition 2 thus obtained contained a nickel-cobalt alloy containing 1% by weight of cobalt and 99% by weight of nickel and 0.002 part by weight of sulfur with respect to 100 parts by weight of the nickel-cobalt alloy. The composition 2 had an average particle size of 0.10 μm.

As shown in Table 1, the composition 2 thus obtained had a Young's modulus of 190 GPa, a 0.2% proof stress of 583 MPa, and a conductivity of 16% IACS. Further, as for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 3

Electroforming was carried out with a plating solution identical in condition to that of Example 1 by using a matrix identical to that of Example 1 under the same conditions as those for Example 1. After that, the resulting electroformed layer was taken out from the electrolytic cell, placed into a constant-temperature bath whose inner temperature had been kept at 200° C. or higher to 350° C. or lower, and heat-treated by being left in the constant-temperature bath for 1 hour or longer to 48 hours or shorter, whereby a composition 3 for making a contact was obtained.

As shown in Table 1, the composition 3 thus obtained contained a nickel-cobalt alloy containing 1% by weight of cobalt and 99% by weight of nickel and 0.002 part by weight of sulfur with respect to 100 parts by weight of the nickel-cobalt alloy. The composition 3 had an average particle size of 0.35 μm.

As shown in Table 1, the composition 3 thus obtained had a Young's modulus of 193 GPa, a 0.2% proof stress of 560 MPa, and a conductivity of 18% IACS. Further, as for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 4

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 5 g/L or more to 17 g/L or less (Co=1 g/L or more to 3 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 0.05% by weight or more to 0.5% by weight or less of saccharin was used, and electroforming was carried out by using a matrix identical to that of Example 1 under the same conditions as those for Example 1.

After that, the resulting electroformed layer was taken out from the electrolytic cell, whereby a composition 4 for making a contact was obtained. As shown in Table 1, the composition 4 thus obtained contained a nickel-cobalt alloy containing 1% by weight of cobalt and 99% by weight of nickel and 0.05 part by weight of sulfur with respect to 100 parts by weight of the nickel-cobalt alloy. The composition 4 had an average particle size of 0.07 μm.

As shown in Table 1, the composition 4 thus obtained had a Young's modulus of 195 GPa, a 0.2% proof stress of 802 MPa, and a conductivity of 16% IACS. Further, as for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 5

Electroforming was carried out with a plating solution identical in condition to that of Example 4 by using a matrix identical to that of Example 1 under the same conditions as those for Example 1. After that, the resulting electroformed layer was taken out from the electrolytic cell, placed into a constant-temperature bath whose inner temperature had been kept at 180° C. or higher to 230° C. or lower, and heat-treated by being left in the constant-temperature bath for 0.1 hour or longer to 3 hours or shorter, whereby a composition 5 for making a contact was obtained.

As shown in Table 1, the composition 5 thus obtained contained a nickel-cobalt alloy containing 1% by weight of cobalt and 99% by weight of nickel and 0.05 part by weight of sulfur with respect to 100 parts by weight of the nickel-cobalt alloy. The composition 5 had an average particle size of 0.10 μm.

As shown in Table 1, the composition 5 thus obtained had a Young's modulus of 191 GPa, a 0.2% proof stress of 799 MPa, and a conductivity of 16% IACS. Further, as for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 6

Electroforming was carried out with a plating solution identical in condition to that of Example 4 by using a matrix identical to that of Example 1 under the same conditions as those for Example 1. After that, the resulting electroformed layer was taken out from the electrolytic cell, placed into a constant-temperature bath whose inner temperature had been kept at 200° C. or higher to 350° C. or lower, and heat-treated by being left in the constant-temperature bath for 1 hour or longer to 48 hours or shorter, whereby a composition 6 for making a contact was obtained.

As shown in Table 1, the composition 6 thus obtained contained a nickel-cobalt alloy containing 1% by weight of cobalt and 99% by weight of nickel and 0.05 part by weight of sulfur with respect to 100 parts by weight of the nickel-cobalt alloy. The composition 6 had an average particle size of 0.35 μm.

As shown in Table 1, the composition 6 thus obtained had a Young's modulus of 191 GPa, a 0.2% proof stress of 730 MPa, and a conductivity of 18% IACS. Further, as for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 7

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 5 g/L or more to 17 g/L or less (Co=1 g/L or more to 3 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 0.6% by weight or more to 1% by weight or less of saccharin was used, and electroforming was carried out by using a matrix identical to that of Example 1 under the same conditions as those for Example 1.

After that, the resulting electroformed layer was taken out from the electrolytic cell, whereby a composition 7 for making a contact was obtained. As shown in Table 1, the composition 7 thus obtained contained a nickel-cobalt alloy containing 1% by weight of cobalt and 99% by weight of nickel and 0.1 part by weight of sulfur with respect to 100 parts by weight of the nickel-cobalt alloy. The composition 7 had an average particle size of 0.07 μm.

As shown in Table 1, the composition 7 thus obtained had a Young's modulus of 191 GPa, a 0.2% proof stress of 818 MPa, and a conductivity of 16% IACS. Further, as for corrosion resistance, five out of five samples showed no rust thereon as a result of the salt spray test, and four out of five samples showed no rust thereon as a result of the mixed gas test. Moreover, five out of five samples suffered from no copper damage as a result of the copper-damage color-change test.

The corrosion resistance of (result of the mixed gas test on) the composition 7 was such that four out of five samples showed no rust thereon. However, since the result of the salt spray test satisfies the criterion for judgment, the composition 7 can be said to be sufficient in corrosion resistance to be used as a material for a versatile contact.

Meanwhile, the corrosion resistance of (result of the mixed gas test on) the compositions 1 to 6 was such that five out of five samples showed no rust thereon. Therefore, the compositions 1 to 6 are even higher in corrosion resistance than the composition 7 and seem to be more preferable materials for achieving electronic components using versatile contacts.

Example 8

Electroforming was carried out with a plating solution identical in condition to that of Example 7 by using a matrix identical to that of Example 1 under the same conditions as those for Example 1. After that, the resulting electroformed layer was taken out from the electrolytic cell, placed into a constant-temperature bath whose inner temperature had been kept at 180° C. or higher to 230° C. or lower, and heat-treated by being left in the constant-temperature bath for 0.1 hour or longer to 3 hours or shorter, whereby a composition 8 for making a contact was obtained.

As shown in Table 1, the composition 8 thus obtained contained a nickel-cobalt alloy containing 1% by weight of cobalt and 99% by weight of nickel and 0.1 part by weight of sulfur with respect to 100 parts by weight of the nickel-cobalt alloy. The composition 8 had an average particle size of 0.10 μm.

As shown in Table 1, the composition 8 thus obtained had a Young's modulus of 194 GPa, a 0.2% proof stress of 810 MPa, and a conductivity of 16% IACS. Further, as for corrosion resistance, five out of five samples showed no rust thereon as a result of the salt spray test, and four out of five samples showed no rust thereon as a result of the mixed gas test. Moreover, five out of five samples suffered from no copper damage as a result of the copper-damage color-change test.

The corrosion resistance of (result of the mixed gas test on) the composition 8 was such that four out of five samples showed no rust thereon. However, since the result of the salt spray test satisfies the criterion for judgment, the composition 8 can be said to be sufficient in corrosion resistance to be used as a material for a versatile contact.

Meanwhile, the corrosion resistance of (result of the mixed gas test on) the compositions 1 to 6 was such that five out of five samples showed no rust thereon. Therefore, the compositions 1 to 6 are even higher in corrosion resistance than the composition 8 and seem to be more preferable materials for achieving electronic components using versatile contacts.

Example 9

Electroforming was carried out with a plating solution identical in condition to that of Example 7 by using a matrix identical to that of Example 1 under the same conditions as those for Example 1. After that, the resulting electroformed layer was taken out from the electrolytic cell, placed into a constant-temperature bath whose inner temperature had been kept at 200° C. or higher to 350° C. or lower, and heat-treated by being left in the constant-temperature bath for 1 hour or longer to 48 hours or shorter, whereby a composition 9 for making a contact was obtained.

As shown in Table 1, the composition 9 thus obtained contained a nickel-cobalt alloy containing 1% by weight of cobalt and 99% by weight of nickel and 0.1 part by weight of sulfur with respect to 100 parts by weight of the nickel-cobalt alloy. The composition 9 had an average particle size of 0.35 μm.

As shown in Table 1, the composition 8 thus obtained had a Young's modulus of 196 GPa, a 0.2% proof stress of 744 MPa, and a conductivity of 18% IACS. Further, as for corrosion resistance, five out of five samples showed no rust thereon as a result of the salt spray test, and four out of five samples showed no rust thereon as a result of the mixed gas test. Moreover, five out of five samples suffered from no copper damage as a result of the copper-damage color-change test.

The corrosion resistance of (result of the mixed gas test on) the composition 9 was such that four out of five samples showed no rust thereon. However, since the result of the salt spray test satisfies the criterion for judgment, the composition 9 can be said to be sufficient in corrosion resistance to be used as a material for a versatile contact.

Meanwhile, the corrosion resistance of (result of the mixed gas test on) the compositions 1 to 6 was such that five out of five samples showed no rust thereon. Therefore, the compositions 1 to 6 are even higher in corrosion resistance than the composition 9 and seem to be more suitable materials for achieving electronic components using versatile contacts.

Example 10

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 5 g/L or more to 60 g/L or less (Co=1 g/L or more to 10 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 0.1% by weight or less of a surface-active agent, and 0.05% by weight or more to 0.5% by weight or less of saccharin was used. A plating bath was prepared by filling an electrolytic cell with the plating solution.

Electroforming was carried out by using a matrix identical to that of Example 1 with the plating bath set at a temperature of 40° C. or higher to 65° C. or lower and at an electric current density of 1 $A/dm^2$ or to 12 $A/dm^2$ or lower. After that, the resulting electroformed layer was taken out from the electrolytic cell, placed into a constant-temperature bath whose inner temperature had been kept at 180° C. or higher to 230° C. or lower, and heat-treated by being left in the constant-temperature bath for 0.1 hour or longer to 5 hours or shorter, whereby a composition 10 for making a contact was obtained.

As shown in Table 2, the composition 10 thus obtained contained a nickel-cobalt alloy containing 5% by weight of cobalt and 95% by weight of nickel and 0.02 part by weight of sulfur with respect to 100 parts by weight of the nickel-cobalt alloy. The composition 10 had an average particle size of 0.24 μm.

As shown in Table 2, the composition 10 thus obtained had a Young's modulus of 191 GPa, a 0.2% proof stress of 1072 MPa, and a conductivity of 15% IACS. Further, as for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 11

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 25 g/L or more to 120 g/L or less (Co=5 g/L or more to 20 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 0.1% by weight or less of a surface-active agent, and 0.05% by weight or more to 0.5% by weight or less of saccharin was used. A plating bath was prepared by filling an electrolytic cell with the plating solution.

Electroforming was carried out under the same conditions as those for Example 10 by using a matrix identical to that of Example 1. After that, the electroformed layer thus obtained was taken out from the electrolytic cell and heat-treated in the same manner as in Example 10, whereby a composition 11 for making a contact was obtained.

As shown in Table 2, the composition 11 contained a nickel-cobalt alloy containing 8% by weight of cobalt and 92% by weight of nickel and 0.02 part by weight of sulfur with respect to 100 parts by weight of the nickel-cobalt alloy. The composition 11 had an average particle size of 0.23 μm.

As shown in Table 2, the composition 11 had a Young's modulus of 192 GPa, a 0.2% proof stress of 1116 MPa, and a conductivity of 15% IACS. Further, as for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 12

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 50 g/L or more to 170 g/L or less (Co=10 g/L or more to 30 g/L or less) of 60% sulfamic acid Co (manufactured by Showa Chemical Industry Co., Ltd.), 20

TABLE 2

| | | Criteria for Judgment | Example 10 | Example 11 | Example 12 | Example 13 | Example 14 | Example 15 | Example 16 |
|---|---|---|---|---|---|---|---|---|---|
| Proportion of Co in Alloy (wt %) | | NA | 5 | 8 | 18 | | | 19.9 | |
| Sulfur Content (parts by weight) | | NA | | | 0.02 | | | 0.002 | |
| Average Particle Size (μm) | | NA | 0.24 | 0.23 | 0.23 | 0.27 | 0.07 | 0.1 | 0.35 |
| Young's Modulus (GPa) | | 190 or higher | 191 | 192 | 191 | 197 | 191 | 198 | 202 |
| 0.2% Proof Stress (MPa) | | 560 or higher | 1072 | 1116 | 1318 | 1100 | 810 | 822 | 767 |
| Conductivity (% IACS) | | 13 or higher | 15 | 15 | 14 | 15 | 13 | 14 | 15 |
| Corrosion Resistance | Salt Spray | 5/5 No Rust | 5/5 | 5/5 | 5/5 | 5/5 | 5/5 | 5/5 | 5/5 |
| | Mixed Gas | 5/5 No Rust | 5/5 | 5/5 | 5/5 | 5/5 | 5/5 | 5/5 | 5/5 |
| Change in Color due to Copper Damage | | 5/5 No Color Change | 5/5 | 5/5 | 5/5 | 5/5 | 5/5 | 5/5 | 5/5 |

g/L or more to 40 g/L or less of boric acid (manufactured by Showa Chemical Industry Co., Ltd.), 0.01% by weight or more to 0.1% by weight or less of a surface-active agent, and 0.05% by weight or more to 0.5% by weight or less of saccharin was used. A plating bath was prepared by filling an electrolytic cell with the plating solution.

Electroforming was carried out under the same conditions as those for Example 10 by using a matrix identical to that of Example 1. After that, the electroformed layer thus obtained was taken out from the electrolytic cell and heat-treated in the same manner as in Example 10, whereby a composition 12 for making a contact was obtained.

As shown in Table 2, the composition 12 contained a nickel-cobalt alloy containing 18% by weight of cobalt and 82% by weight of nickel and 0.02 part by weight of sulfur with respect to 100 parts by weight of the nickel-cobalt alloy. The composition 12 had an average particle size of 0.23 μm.

As shown in Table 2, the composition 12 had a Young's modulus of 191 GPa, a 0.2% proof stress of 1318 MPa, and a conductivity of 14% IACS. Further, as for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 13

A plating bath was prepared by filling an electrolytic cell with the same plating solution as in Example 12. Electroforming was carried out under the same conditions as those for Example 10 by using a matrix identical to that of Example 1. After that, the electroformed layer thus obtained was taken out from the electrolytic cell and heat-treated in the same manner as in Example 10, whereby a composition 13 for making a contact was obtained.

As shown in Table 2, the composition 13 contained a nickel-cobalt alloy containing 18% by weight of cobalt and 82% by weight of nickel and 0.02 part by weight of sulfur with respect to 100 parts by weight of the nickel-cobalt alloy. The composition 13 had an average particle size of 0.27 μm.

As shown in Table 2, the composition 13 had a Young's modulus of 197 GPa, a 0.2% proof stress of 1100 MPa, and a conductivity of 15% IACS. Further, as for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

The composition 13, which was produced in the same manner as the composition 12, achieved good results on Young's modulus, 0.2% proof stress, conductivity, corrosion resistance, change in color due to copper damage with high reproducibility.

Example 14

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 27 g/L or more to 170 g/L or less (Co=5 g/L or more to 30 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 0.001% by weight or more to 0.03% by weight or less of saccharin was used, and electroforming was carried out by using a matrix identical to that of Example 1.

After that, the resulting electroformed layer was taken out from the electrolytic cell, whereby a composition 14 for making a contact was obtained. As shown in Table 2, the composition 14 thus obtained contained a nickel-cobalt alloy containing 19.9% by weight of cobalt and 80.1% by weight of nickel and 0.002 part by weight of sulfur with respect to 100 parts by weight of the nickel-cobalt alloy. The composition 14 had an average particle size of 0.07 μm.

As shown in Table 2, the composition 14 had a Young's modulus of 191 GPa, a 0.2% proof stress of 810 MPa, and a conductivity of 13% IACS. As for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 15

Electroforming was carried out with a plating solution identical in condition to that of Example 14 by using a matrix identical to that of Example 1. After that, the resulting electroformed layer was taken out from the electrolytic cell, placed into a constant-temperature bath whose inner temperature had been kept at 180° C. or higher to 230° C. or lower, and heat-treated by being left in the constant-temperature bath for 0.1 hour or longer to 3 hours or shorter, whereby a composition 15 for making a contact was obtained.

As shown in Table 2, the composition 15 thus obtained contained a nickel-cobalt alloy containing 19.9% by weight of cobalt and 80.1% by weight of nickel and 0.002 part by weight of sulfur with respect to 100 parts by weight of the nickel-cobalt alloy. The composition 15 had an average particle size of 0.10 μm.

As shown in Table 2, the composition 15 had a Young's modulus of 198 GPa, a 0.2% proof stress of 822 MPa, and a conductivity of 14% IACS. As for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

The composition 15 exhibited a higher conductivity of 14% than the conductivity (13% IACS) of phosphor bronze C5191-H, which is used as a spring material for a common electronic component. Therefore, the composition 15 is even higher in conductivity than the composition 14 obtained in Example 14, and seems to be more suitable for achieving an electronic component that conducts electricity at a high electric current.

Example 16

Electroforming was carried out with a plating solution identical in condition to that of Example 14 by using a matrix identical to that of Example 1. After that, the resulting electroformed layer was taken out from the electrolytic cell, placed into a constant-temperature bath whose inner temperature had been kept at 200° C. or higher to 350° C. or lower, and heat-treated by being left in the constant-temperature bath for 1 hour or longer to 48 hours or shorter, whereby a composition 16 for making a contact was obtained.

As shown in Table 2, the composition 16 thus obtained contained a nickel-cobalt alloy containing 19.9% by weight of cobalt and 80.1% by weight of nickel and 0.002 part by weight of sulfur with respect to 100 parts by weight of the nickel-cobalt alloy. The composition 16 had an average particle size of 0.35 μm.

As shown in Table 2, the composition 16 thus obtained had a Young's modulus of 202 GPa, a 0.2% proof stress of 767 MPa, and a conductivity of 15% IACS. As for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 17

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 27 g/L or more to 170 g/L or less (Co=5 g/L or more to 30 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 0.05% by weight or more to 0.5% by weight or less of saccharin was used, and electroforming was carried out by using a matrix identical to that of Example 1.

After that, the resulting electroformed layer was taken out from the electrolytic cell, whereby a composition 17 for making a contact was obtained. As shown in Table 3, the composition 17 thus obtained contained a nickel-cobalt alloy containing 19.9% by weight of cobalt and 80.1% by weight of nickel and 0.05 part by weight of sulfur with respect to 100 parts by weight of the nickel-cobalt alloy. The composition 17 had an average particle size of 0.07 μm.

As shown in Table 3, the composition 17 thus obtained had a Young's modulus of 201 GPa, a 0.2% proof stress of 1466 MPa, and a conductivity of 13% IACS. As for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 18

Electroforming was carried out with a plating solution identical in condition to that of Example 17 by using a matrix identical to that of Example 1. After that, the resulting electroformed layer was taken out from the electrolytic cell, placed into a constant-temperature bath whose inner temperature had been kept at 180° C. or higher to 230° C. or lower, and heat-treated by being left in the constant-temperature bath for 0.1 hour or longer to 3 hours or shorter, whereby a composition 18 for making a contact was obtained.

As shown in Table 3, the composition 18 thus obtained contained a nickel-cobalt alloy containing 19.9% by weight of cobalt and 80.1% by weight of nickel and 0.05 part by weight of sulfur with respect to 100 parts by weight of the nickel-cobalt alloy. The composition 18 had an average particle size of 0.10 μm.

As shown in Table 3, the composition 18 had a Young's modulus of 203 GPa or higher, a 0.2% proof stress of 1406 MPa, and a conductivity of 14% IACS. As for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

The composition 18 exhibited a higher conductivity of 14% than the conductivity (13% IACS) of phosphor bronze C5191-H, which is used as a spring material for a common electronic component. Therefore, the composition 18 is even higher in conductivity than the composition 17 obtained in Example 17, and seems to be more suitable for achieving an electronic component that conducts electricity at a high electric current.

Example 19

Electroforming was carried out with a plating solution identical in condition to that of Example 17 by using a matrix identical to that of Example 1. After that, the resulting electroformed layer was taken out from the electrolytic cell, placed into a constant-temperature bath whose inner temperature had been kept at 200° C. or higher to 350° C. or lower, and heat-treated by being left in the constant-tem-

TABLE 3

| | Criteria for Judgment | Example 17 | Example 18 | Example 19 | Example 20 | Example 21 | Example 22 |
|---|---|---|---|---|---|---|---|
| Proportion of Co in Alloy (wt %) | NA | 19.9 | | | | | |
| Sulfur Content (parts by weight) | NA | 0.05 | | | 0.1 | | |
| Average Particle Size (μm) | NA | 0.07 | 0.10 | 0.35 | 0.07 | 0.10 | 0.35 |
| Young's Modulus (GPa) | 190 or higher | 201 | 203 | 196 | 203 | 199 | 199 |
| 0.2% Proof Stress (MPa) | 560 or higher | 1466 | 1406 | 1231 | 1435 | 1375 | 1191 |
| Conductivity (% IACS) | 13 or higher | 13 | 14 | 15 | 13 | 14 | 15 |
| Corrosion Resistance — Salt Spray | 5/5 No Rust | 5/5 | 5/5 | 5/5 | 5/5 | 5/5 | 5/5 |
| Corrosion Resistance — Mixed Gas | 5/5 No Rust | 5/5 | 5/5 | 5/5 | 4/5 | 4/5 | 4/5 |
| Change in Color due to Copper Damage | 5/5 No Color Change | 5/5 | 5/5 | 5/5 | 5/5 | 5/5 | 5/5 |

perature bath for 1 hour or longer to 48 hours or shorter, whereby a composition 19 for making a contact was obtained.

As shown in Table 3, the composition 19 thus obtained contained a nickel-cobalt alloy containing 19.9% by weight of cobalt and 80.1% by weight of nickel and 0.05 part by weight of sulfur with respect to 100 parts by weight of the nickel-cobalt alloy. The composition 19 had an average particle size of 0.35 μm.

As shown in Table 3, the composition 19 thus obtained had a Young's modulus of 196 GPa, a 0.2% proof stress of 1231 MPa, and a conductivity of 15% IACS. As for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Example 20

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 27 g/L or more to 170 g/L or less (Co=5 g/L or more to 30 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 0.6% by weight or more to 1% by weight or less of saccharin was used, and electroforming was carried out by using a matrix identical to that of Example 1.

After that, the resulting electroformed layer was taken out from the electrolytic cell, whereby a composition 20 for making a contact was obtained. As shown in Table 3, the composition 20 thus obtained contained a nickel-cobalt alloy containing 19.9% by weight of cobalt and 80.1% by weight of nickel and 0.1 part by weight of sulfur with respect to 100 parts by weight of the nickel-cobalt alloy. The composition 20 had an average particle size of 0.07 μm.

As shown in Table 3, the composition 20 thus obtained had a Young's modulus of 203 GPa, a 0.2% proof stress of 1435 MPa, and a conductivity of 13% IACS. As for corrosion resistance, five out of five samples showed no rust thereon as a result of the salt spray test, and four out of five samples showed no rust thereon as a result of the mixed gas test. Moreover, five out of five samples suffered from no copper damage as a result of the copper-damage color-change test.

The corrosion resistance of (result of the mixed gas test on) the composition 17 was such that five out of five samples showed no rust thereon. Therefore, the composition 17 is even higher in corrosion resistance than the composition 20 and seem to be a more suitable material for achieving an electronic component using a versatile contact.

Of course, since the result of the composition 20 satisfies the criterion for judgment by the salt spray test, the composition 20 can be said to be sufficient in corrosion resistance to be used as a material for a versatile contact.

Example 21

Electroforming was carried out with a plating solution identical in condition to that of Example 20 by using a matrix identical to that of Example 1. After that, the resulting electroformed layer was taken out from the electrolytic cell, placed into a constant-temperature bath whose inner temperature had been kept at 180° C. or higher to 230° C. or lower, and heat-treated by being left in the constant-temperature bath for 0.1 hour or longer to 3 hours or shorter, whereby a composition 21 for making a contact was obtained.

As shown in Table 3, the composition 21 thus obtained contained a nickel-cobalt alloy containing 19.9% by weight of cobalt and 80.1% by weight of nickel and 0.1 part by weight of sulfur with respect to 100 parts by weight of the nickel-cobalt alloy. The composition 21 had an average particle size of 0.10 μm.

As shown in Table 3, the composition 21 had a Young's modulus of 199 GPa, a 0.2% proof stress of 1375 MPa, and a conductivity of 14% IACS. As for corrosion resistance, five out of five samples showed no rust thereon as a result of the salt spray test, and four out of five samples showed no rust thereon as a result of the mixed gas test. Moreover, five out of five samples suffered from no copper damage as a result of the copper-damage color-change test.

The composition 21 exhibited a higher conductivity of 14% than the conductivity (13% IACS) of phosphor bronze C5191-H, which is used as a spring material for a common electronic component. Therefore, the composition 21 is even higher in conductivity than the composition 20 obtained in Example 20, and seems to be more suitable for achieving an electronic component that conducts electricity at a high electric current.

The corrosion resistance of (result of the mixed gas test on) the composition 18 was such that five out of five samples showed no rust thereon. Therefore, the composition 18 is even higher in corrosion resistance than the composition 21 obtained in Example 21 and seem to be a more suitable material for achieving an electronic component using a versatile contact.

Of course, since the result of the composition 21 satisfies the criterion for judgment by the salt spray test, the composition 21 can be said to be sufficient in corrosion resistance to be used as a material for a versatile contact.

Example 22

Electroforming was carried out with a plating solution identical in condition to that of Example 20 by using a matrix identical to that of Example 1. After that, the resulting electroformed layer was taken out from the electrolytic cell, placed into a constant-temperature bath whose inner temperature had been kept at 200° C. or higher to 350° C. or lower, and heat-treated by being left in the constant-temperature bath for 1 hour or longer to 48 hours or shorter, whereby a composition 22 for making a contact was obtained.

As shown in Table 3, the composition 22 thus obtained contained a nickel-cobalt alloy containing 19.9% by weight of cobalt and 80.1% by weight of nickel and 0.1 part by weight of sulfur with respect to 100 parts by weight of the nickel-cobalt alloy. The composition 22 had an average particle size of 0.35 μm.

As shown in Table 3, the composition 22 thus obtained had a Young's modulus of 199 GPa, a 0.2% proof stress of 1191 MPa, and a conductivity of 15% IACS. As for corrosion resistance, five out of five samples showed no rust thereon as a result of the salt spray test, and four out of five samples showed no rust thereon as a result of the mixed gas test. Moreover, five out of five samples suffered from no copper damage as a result of the copper-damage color-change test.

The corrosion resistance of (result of the mixed gas test on) the composition 19 was such that five out of five samples showed no rust thereon. Therefore, the composition 19 is even higher in corrosion resistance than the composition 22 obtained in Example 22 and seem to be a more suitable material for achieving an electronic component using a versatile contact. Of course, since the result of the composition 22 satisfies the criterion for judgment by the salt spray test, the composition 22 can be said to be sufficient in corrosion resistance to be used as a material for a versatile contact.

Example 23

The present example discusses a relationship between the duration of heat treatment of a composition for making a contact as obtained by electroforming and the properties of the composition.

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 50 g/L or more to 170 g/L or less (Co=10 g/L or more to 30 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 0.1% by weight or less of a surface-active agent, and 0.05% by weight or more to 0.5% by weight or less of saccharin was used. A plating bath was prepared by filling an electrolytic cell with the plating solution.

The matrix was placed in the electrolytic cell, and electroforming was carried out with the plating bath set at a temperature of 40° C. or higher to 65° C. or lower and at an electric current density of 1 A/dm$^2$ or higher to 12 A/dm$^2$ or lower.

After that, the electroformed layer (composition for making a contact) thus obtained was taken out from the electrolytic bath, and then heat-treated under any of the following conditions (i) to (iii):

(i) The composition was not heated.

(ii) The composition was left for 1 hour or longer to 5 hours or shorter in a constant-temperature bath whose inner temperature had been kept at 230° C. or higher to 270° C. or lower.

(iii) The composition was left for 0.2 hour or longer to 1 hour or shorter in a constant-temperature bath whose inner temperature had been kept at 300° C. or higher to 350° C. or lower.

Table 4 shows the constitutions and properties of the compositions for making a contact as heat-treated under any of the conditions (i) to (iii).

TABLE 4

| | Criteria for Judgment | Example 23 Condition (i) | Condition (ii) | Condition (iii) |
|---|---|---|---|---|
| Proportion of Co in Alloy (wt %) | NA | 18 | 18 | 18 |
| Sulfur Content (parts by weight) | NA | 0.02 | 0.02 | 0.02 |
| Average Particle Size (μm) | NA | 0.08 | 0.23 | 0.27 |
| Young's Modulus (GPa) | 190 or higher | 199 | 191 | 197 |
| 0.2% Proof Stress (MPa) | 560 or higher | 1466 | 1318 | 1100 |
| Conductivity (% IACS) | 13 or higher | 13 | 14 | 15 |

As shown in Table 4, each of the compositions heat-treated under any of the conditions (i) to (iii) contained a nickel-cobalt alloy containing 18% by weight of cobalt and 82% by weight of nickel and 0.02 part by weight of sulfur with respect to 100 parts by weight of the nickel-cobalt alloy.

Even under the condition (1), i.e. even in a case where the composition is not heated, the composition exhibits criterion values or higher for Young's modulus, 0.2% proof stress, and conductivity, and is found to exhibit necessary and sufficient contact force with a short stroke. Therefore, in a case where a composition for making a contact according to one or more embodiments of the present invention is produced by electroforming, it can be said that the electroformed layer thus obtained does not necessarily need to be heated.

Then, raising the heating temperature in the order of conditions (ii) and (iii) caused the average particle size to become larger accordingly to be in the range of 0.10 μm or larger to 0.35 μm or smaller, and also caused the conductivity to rise.

Specifically, under the condition (i), the resulting composition exhibited a conductivity (13% IACS) that is equal to that of the aforementioned phosphor bronze C5191-H, but under the conditions (ii) and (iii), the resulting composition exhibited a conductivity that is higher than that of phosphor bronze C5191-H.

Meanwhile, as the heating temperature increased, the 0.2% proof stress tended to decrease. However, all of the compositions exhibited values that are much higher than the criteria for judgment.

A comparison between the condition (ii) and the condition (iii) showed that the treatment under the condition (iii) is higher in temperature and shorter in time than that under the condition (ii), the composition obtained under the condition (iii) was higher in conductivity than that treated under the condition (ii).

Thus, for improvement in the conductivity of the resulting composition for making a contact, it can be said to be preferable that the electroformed layer obtained by the electroforming step be subjected to heat treatment.

Further, as for the heating temperature and the heating time, it is found that by appropriately selecting the heating temperature and the heating time under such conditions that heating is carried out at 150° C. or higher to 350° C. or lower and longer than 0 hour to 48 hours or shorter, the average particle size of a composition for making a contact according to one or more embodiments of the present invention can be adjusted in the range of 0.07 μm or larger to 0.35 μm or smaller and the conductivity can be adjusted at a level equal to or higher than the criterion for judgment.

Comparative Example 1

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 0.5 g/L or more to 5 g/L or less (Co=0.1 g/L or more to 1 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 0.001% by weight or more to 0.03% by weight or less of saccharin was used, and electroforming was carried out by using a matrix identical to that of Example 1.

After that, the resulting electroformed layer was taken out from the electrolytic cell, placed into a constant-temperature bath whose inner temperature had been kept at 180° C. or higher to 230° C. or lower, and heat-treated by being left in the constant-temperature bath for 0.1 hour or longer to 3 hours or shorter, whereby a comparative composition 1 for making a contact was obtained.

As shown in Table 5, the comparative composition 1 thus obtained contained a nickel-cobalt alloy containing 0.9% by weight of cobalt and 99.1% by weight of nickel and 0.002 part by weight of sulfur with respect to 100 parts by weight of the nickel-cobalt alloy. The comparative composition 1 had an average particle size of 0.35 μm.

As shown in Table 5, the comparative composition 1 thus obtained had a Young's modulus of 151 GPa, a 0.2% proof stress of 590 MPa, and a conductivity of 19% IACS. As for corrosion resistance, five out of five samples showed no rust thereon as a result of the salt spray test, and four out of five samples showed no rust thereon as a result of the mixed gas test. Moreover, five out of five samples suffered from no copper damage as a result of the copper-damage color-change test.

Because of the insufficiency of the Young's modulus, the comparative composition 1 can be said to be insufficient to achieve a highly-versatile contact that can ensure necessary and sufficient contact force with a short stroke.

or more to 35 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 0.01% by weight or more to 0.5% by weight or less of saccharin was used, and electroforming was carried out by using a matrix identical to that of Example 1.

After that, the resulting electroformed layer was taken out from the electrolytic cell, placed into a constant-temperature bath whose inner temperature had been kept at 230° C. or higher to 300° C. or lower, and heat-treated by being left in the constant-temperature bath for 1 hour or longer to 24 hours or shorter, whereby a comparative composition 2 for making a contact was obtained.

As shown in Table 5, the comparative composition 2 thus obtained contained a nickel-cobalt alloy containing 20% by weight of cobalt and 80% by weight of nickel and 0.013 part by weight of sulfur with respect to 100 parts by weight of the nickel-cobalt alloy. The comparative composition 2 had an average particle size of 0.29 μm.

As shown in Table 5, the comparative composition 2 thus obtained had a Young's modulus of 192 GPa, a 0.2% proof stress of 1307 MPa, and a conductivity of 16% IACS. As for corrosion resistance, five out of five samples showed no rust thereon as a result of the salt spray test, and four out of five samples showed no rust thereon as a result of the mixed gas test. However, two out of five samples suffered from copper damage as a result of the copper-damage color-change test.

Because the occurrence of copper damage, the comparative composition 2 can be said to be insufficient to achieve a highly-versatile contact that can ensure necessary and sufficient contact force with a short stroke.

Comparative Example 3

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 5 g/L or more to 17 g/L or less (Co=1 g/L or more to 3 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to

TABLE 5

| | | Criteria for Judgment | Comp. Ex. 1 | Comp. Ex. 2 | Comp. Ex. 3 | Comp. Ex. 4 | Comp. Ex. 5 | Comp. Ex. 6 | Comp. Ex. 7 Bronze |
|---|---|---|---|---|---|---|---|---|---|
| Proportion of Co in Alloy (wt %) | | NA | 0.9 | 20 | 1 | 10 | 18 | 1 | NA |
| Sulfur Content (parts by weight) | | NA | 0.002 | 0.013 | 0.0001 | 0.11 | 0.03 | 0.02 | NA |
| Average Particle Size (μm) | | NA | 0.35 | 0.29 | 0.31 | 0.23 | 0.06 | 0.36 | NA |
| Young's Modulus (GPa) | | 190 or higher | 151 | 192 | 209 | 201 | 196 | 191 | 95 |
| 0.2% Proof Stress (MPa) | | 560 or higher | 590 | 1307 | 489 | 1267 | 1428 | 541 | 288 |
| Conductivity (% IACS) | | 13 or higher | 19 | 16 | 15 | 14 | 12.7 | 18 | 11 |
| Corrosion Resistance | Salt Spray | 5/5 No Rust | 5/5 | 5/5 | 5/5 | 3/5 | 5/5 | 5/5 | 0/5 |
| | Mixed Gas | 4/5 No Rust | 5/5 | 5/5 | 5/5 | 3/5 | 5/5 | 5/5 | 0/5 |
| Change in Color due to Copper Damage | | 5/5 No Color Change | 5/5 | 3/5 | 5/5 | 5/5 | 5/5 | 5/5 | 0/5 |

Comparative Example 2

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 83 g/L or more to 193 g/L or less (Co=15 g/L 1% by weight or less of a surface-active agent, and 0% by weight or more to 0.001% by weight or less of saccharin was used, and electroforming was carried out by using a matrix identical to that of Example 1.

After that, the resulting electroformed layer was taken out from the electrolytic cell, placed into a constant-temperature bath whose inner temperature had been kept at 200° C. or higher to 350° C. or lower, and heat-treated by being left in the constant-temperature bath for 1 hour or longer to 48 hours or shorter, whereby a comparative composition 3 for making a contact was obtained.

As shown in Table 5, the comparative composition 3 thus obtained contained a nickel-cobalt alloy containing 1% by weight of cobalt and 99% by weight of nickel and 0.0001 part by weight of sulfur with respect to 100 parts by weight of the nickel-cobalt alloy. The comparative composition 3 had an average particle size of 0.31 μm.

As shown in Table 5, the comparative composition 3 thus obtained had a Young's modulus of 209 GPa, a 0.2% proof stress of 489 MPa, and a conductivity of 15% IACS. As for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Because of the insufficiency of the 0.2 proof stress, the comparative composition 3 can be said to be insufficient to achieve a highly-versatile contact that can ensure necessary and sufficient contact force with a short stroke.

Comparative Example 4

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 27 g/L or more to 138 g/L or less (Co=5 g/L or more to 25 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 1% by weight or more to 1.5% by weight or less of saccharin was used, and electroforming was carried out by using a matrix identical to that of Example 1.

After that, the resulting electroformed layer was taken out from the electrolytic cell, placed into a constant-temperature bath whose inner temperature had been kept at 250° C. or higher to 270° C. or lower, and heat-treated by being left in the constant-temperature bath for 1 hour or longer to 24 hours or shorter, whereby a comparative composition 4 for making a contact was obtained.

As shown in Table 5, the comparative composition 4 thus obtained contained a nickel-cobalt alloy containing 10% by weight of cobalt and 90% by weight of nickel and 0.11 part by weight of sulfur with respect to 100 parts by weight of the nickel-cobalt alloy. The comparative composition 4 had an average particle size of 0.23

As shown in Table 5, the comparative composition 4 thus obtained had a Young's modulus of 201 GPa, a 0.2% proof stress of 1267 MPa, and a conductivity of 14% IACS.

As for corrosion resistance, five out of five samples suffered from no copper damage as a result of the copper-damage color-change test. However, two out of five samples showed rust thereon as a result of the salt spray test, and two out of five samples showed no rust thereon as a result of the mixed gas test.

Because of the insufficiency of corrosion resistance, the comparative composition 4 can be said to be insufficient to achieve a highly-versatile contact that can ensure necessary and sufficient contact force with a short stroke.

Comparative Example 5

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 50 g/L or more to 170 g/L or less (Co=10 g/L or more to 30 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 0.1% by weight or more to 1% by weight or less of saccharin was used, and electroforming was carried out by using a matrix identical to that of Example 1 at an electric current density of 12 $A/dm^2$ or higher to 15 $A/dm^2$ or lower.

After that, the resulting electroformed layer was taken out from the electrolytic cell, whereby a comparative composition 5 for making a contact was obtained. As shown in Table 5, the comparative composition 5 thus obtained contained a nickel-cobalt alloy containing 18% by weight of cobalt and 82% by weight of nickel and 0.03 part by weight of sulfur with respect to 100 parts by weight of the nickel-cobalt alloy. The comparative composition 5 had an average particle size of 0.06 μm.

As shown in Table 5, the comparative composition 5 thus obtained had a Young's modulus of 196 GPa, a 0.2% proof stress of 1428 MPa, and a conductivity of 12.7% IACS. As for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Because of the insufficiency of the conductivity, the comparative composition 5 can be said to be insufficient to achieve a highly-versatile contact that can ensure necessary and sufficient contact force with a short stroke.

Comparative Example 6

As a NiCo plating solution, a plating solution with a pH of 3 or greater to 5 or less containing 273 g/L or more to 821 g/L or less (Ni=50 g/L or more to 150 g/L or less) of sulfamic acid Ni (NS-160, manufactured by Showa Chemical Industry Co., Ltd.), 5 g/L or more to 17 g/L or less (Co=1 g/L or more to 3 g/L or less) of 60% sulfamic acid Co (manufactured by Showa Chemical Industry Co., Ltd.), 20 g/L or more to 40 g/L or less of boric acid (manufactured by Showa Chemical Industry Co., Ltd.), 0.01% by weight or more to 1% by weight or less of a surface-active agent, and 0.1% by weight or more to 1% by weight or less of saccharin was used, and electroforming was carried out by using a matrix identical to that of Example 1.

After that, the resulting electroformed layer was taken out from the electrolytic cell, placed into a constant-temperature bath whose inner temperature had been kept at 270° C. or higher to 400° C. or lower, and heat-treated by being left in the constant-temperature bath for 1 hour or longer to 48 hours or shorter, whereby a comparative composition 6 for making a contact was obtained.

As shown in Table 5, the comparative composition 6 thus obtained contained a nickel-cobalt alloy containing 1% by weight of cobalt and 99% by weight of nickel and 0.02 part by weight of sulfur with respect to 100 parts by weight of the nickel-cobalt alloy. The comparative composition 6 had an average particle size of 0.36 μm.

As shown in Table 5, the comparative composition 6 thus obtained had a Young's modulus of 191 GPa, a 0.2% proof stress of 541 MPa, and a conductivity of 18% IACS. As for corrosion resistance, five out of five samples showed no rust thereon as a result of the salt spray test, and five out of five samples showed no rust thereon as a result of the mixed gas test. Moreover, five out of five samples suffered from no copper damage as a result of the copper-damage color-change test.

Because of the insufficiency of the 0.2 proof stress, the comparative composition 6 can be said to be insufficient to achieve a highly-versatile contact that can ensure necessary and sufficient contact force with a short stroke.

Comparative Example 7

In Comparative Example 7, phosphor bronze CAC403 (manufactured by HAKUDO Corporation) was used as a control under test. Therefore, Table 5 does not show a value of the proportion of Co in alloy, a value of the sulfur content, or a value of the average particle size. As shown in Table 5, phosphor bronze CAC403 had a Young's modulus of 95 GPa, a 0.2% proof stress of 288 MPa, and a conductivity of 11% IACS. As for corrosion resistance, five out of five samples showed rust thereon as a result of the salt spray test, and five out of five samples showed rust thereon as a result of the mixed gas test. Moreover, five out of five samples suffered from copper damage as a result of the copper-damage color-change test.

Because of the insufficiencies of the Young's modulus, the 0.2% proof stress, the conductivity, and corrosion resistance and the occurrence of a change in color due to copper damage, phosphor bronze CAC403 can be said to be insufficient to achieve a highly-versatile contact that can ensure necessary and sufficient contact force with a short stroke.

The present invention is not limited to the description of the embodiments above, but may be altered by a skilled person within the scope of the claims. An embodiment based on a proper combination of technical means disclosed in different embodiments is encompassed in the technical scope of the present invention.

A composition for making a contact according to the present invention has excellence in Young's modulus, in 0.2% proof stress, in conductivity, in corrosion resistance, and in copper damage inhibiting property, and as such, can provide a contact that can ensure necessary and sufficient contact force with a short stroke.

Such a contact can take any shape for any purpose, and can therefore be used in a variety of connectors and switches. Therefore, the present invention can be widely used in various electric industries, electronic industries, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

11 Matrix
12 Composition for making a contact
13 Conducting base material
14 Insulating layer
15 Cavity
16 Dry film photoresist
17 Mask
18 Metal layer
19 Electrolytic cell
20 DC power source
21 Counter electrode
31 Contact
32 Elastic deformation section
33 Contact section
34 Retaining section
35 Electrode section
200 Contact
201 Retaining section
202 Contact section
203 Elastic deformation section
204 Conductive member
300 Battery connector
310 Housing
320 Contact
α Plating solution
400 Electrodeposited surface
401 Surface that faces the base material
402 Site of measurement

The invention claimed is:

1. A contact comprising:

a retaining section fixed by an insulator;

a contact section which makes sliding contact with a conductive member; and an elastic deformation section which connects the retaining section and the contact section to each other and which is elastically deformable, at least the elastic deformation section containing a composition, made by electroforming, for making the contact, wherein the composition comprises:

a nickel-cobalt alloy comprising greater than or equal to 1% by weight, and less than 20% by weight, of cobalt, and greater than or equal to 0.002 part by weight, and less than or equal to 0.1 part by weight of sulfur with respect to 100 parts by weight of the nickel-cobalt alloy, wherein the composition has an average particle size of greater than or equal to 0.07 μm, and less than or equal to 0.35 μm.

2. The contact as set forth in claim 1, wherein the average particle size is 0.10 μm or larger and 0.35 μm or smaller.

3. The contact as set forth in claim 1, wherein the sulfur is contained in 0.002 part by weight or more to 0.05 part by weight or less with respect to 100 parts by weight of the nickel-cobalt alloy.

4. The contact as set forth in claim 1, wherein the composition is one obtained by heating, at 150° C. or higher to 350° C. or lower for longer than 0 hour to 48 hours or shorter, an electroformed layer made by electroforming.

5. An electronic component comprising the contact as set forth in claim 1.

* * * * *